United States Patent
Lee et al.

(10) Patent No.: US 7,697,050 B1
(45) Date of Patent: Apr. 13, 2010

(54) ACTIVE PIXEL IMAGE SENSOR WITH LOW NOISE RESET

(75) Inventors: Hae-Seung Lee, Bedford, MA (US); Keith G. Fife, Stanford, CA (US)

(73) Assignee: Melexis Tessenderlo NV, Tessenderlo (BE)

( * ) Notice: Subject to any disclaimer, the term of this patent is extended or adjusted under 35 U.S.C. 154(b) by 1202 days.

(21) Appl. No.: 11/221,612

(22) Filed: Sep. 7, 2005

Related U.S. Application Data

(60) Provisional application No. 60/607,541, filed on Sep. 7, 2004.

(51) Int. Cl.
*H04N 3/14* (2006.01)
*H04N 5/335* (2006.01)

(52) U.S. Cl. .................. 348/308; 348/294; 348/302

(58) Field of Classification Search ............... 348/294
See application file for complete search history.

(56) References Cited

U.S. PATENT DOCUMENTS

| | | | |
|---|---|---|---|
| 6,320,616 B1 | 11/2001 | Sauer | |
| 6,323,479 B1 * | 11/2001 | Hynecek et al. | 250/214 L |
| 6,493,030 B1 | 12/2002 | Kozlowski et al. | |
| 6,600,471 B2 * | 7/2003 | Lee et al. | 345/90 |
| 6,697,111 B1 | 2/2004 | Kozlowski et al. | |
| 6,777,660 B1 | 8/2004 | Lee | |
| 6,777,662 B2 * | 8/2004 | Drowley et al. | 250/208.1 |
| 6,903,670 B1 | 6/2005 | Lee et al. | |
| 2002/0043610 A1 * | 4/2002 | Lee et al. | 250/208.1 |
| 2004/0036784 A1 * | 2/2004 | Bock | 348/308 |
| 2004/0174449 A1 | 9/2004 | Lee et al. | |
| 2004/0174450 A1 | 9/2004 | Lee et al. | |
| 2004/0178323 A1 * | 9/2004 | Rhodes | 250/214.1 |
| 2005/0083422 A1 | 4/2005 | Lee et al. | |

FOREIGN PATENT DOCUMENTS

WO    WO 2004/064025 A2    7/2004

OTHER PUBLICATIONS

International Recifier, IRF3710 power mosfet, PD-91309B, IR World Headquarters, pp. 1-9.*
Kozlowski, Les, et al, "A Progressive 1920x1080 Imaging System-on-Chip for HDTV Cameras", AltaSens, Thousand Oaks, California, ISSCC 2005/Session 19/Imagers/19.7, pp. 358-359, 2005 IEEE International Solid-State Circuits Conference 0/7803-8904-2/05.
Decker, Steven, et al, "A 256 x 256 CMOS Imaging Array with Wide Dynamic Range Pixels and Column-Parallel Digital Output", IEEE Journal of Solid State Circuits, vol. 33, No. 12, Dec. 1998, pp. 2081-2091, 0018-9200/98.
"Ultra-Pocket® 5 Kit. Rapid Development Kit for 3.0-Megapixel Credit Card Cameras with Color TFT LCD Display", SMal Camera, Aug. 25, 2005, pp. 1-3, Technologies, http: www.smalcamera.com/up5lcd.html.
"International Search Report", International Searching Authority, PCT/US2004/000153, Jul. 29, 2004, 3 pages.
"Written Opinion of the International Searching Authority", International Searching Authority, PCT/US2004/000153, Jul. 29, 2004, 8 pages.

* cited by examiner

*Primary Examiner*—Sinh Tran
*Assistant Examiner*—Christopher K Peterson
(74) *Attorney, Agent, or Firm*—Gauthier & Connors LLP

(57) ABSTRACT

A method and apparatus to perform low noise reset of a pixel circuit within an active pixel image sensor.

23 Claims, 16 Drawing Sheets

ACTIVE PIXEL IMAGE SENSOR WITH LOW NOISE RESET

RELATED APPLICATIONS

This application claims the benefit of U.S. Provisional Application No. 60/607,541, filed Sep. 7, 2004 and incorporates that application by reference in its entirety.

TECHNICAL FIELD

The present invention relates generally to an image sensor and, more particularly, to low noise reset of a pixel circuit within an active pixel image sensor.

BACKGROUND

Solid-state image sensors have found widespread use in camera systems. The solid-state image sensors in some camera systems have a matrix of photosensitive elements in series with switching and amplifying elements. The photosensitive elements may be, for example, photoreceptors, photodiodes, PIN diodes, phototransistors, charge-coupled device (CCD) gate, or other similar elements. Each photosensitive element receives incident light corresponding to a portion of a scene being imaged. A photosensitive element, along with its accompanying electronics, is called a picture element ("pixel") or a pixel circuit. Each photosensitive element produces an electrical signal relative to the light intensity of the image. The electrical signal generated by the photosensitive element is typically a current proportional to the amount of electromagnetic radiation (light) incident on the photosensitive element.

Many image sensors are implemented using metal oxide semiconductor (MOS) or complimentary metal oxide semiconductor (CMOS) technology. Image sensors with passive pixels and image sensors with active pixels are distinguished within the MOS and CMOS imaging technologies. An active pixel amplifies/buffers the charge that is collected on its photosensitive element. A passive pixel does not perform signal amplification and employs a charge sensitive amplifier that is not integrated in the pixel.

FIG. 1 illustrates a conventional active pixel circuit. The illustrated pixel circuit behaves as a source follower during both pixel reset and pixel readout. A photodiode, $D_P$, produces a photo current, $I_P$, proportional to the incident light intensity. The photo current is integrated on a sense capacitor, $C_S$. The sense capacitor is typically a parasitic reverse-biased PN junction capacitance associated with the photodiode and other parasitic capacitance. A sense MOS transistor, $M_2$, operates as a source follower that buffers the voltage on the sense node, Node 1, nondestructively to a column line, COL. A row select MOS transistor, $M_3$, acting as a switch, activates the source follower transistor when the particular row including the pixel is selected. When the pixel is reset, the gate of a reset MOS transistor, $M_1$, is brought up to a driving voltage, $V_{DD}$, for example, and the voltage on the sense capacitor is reset to approximately $V_{DD}$-$V_{TH}$, where $V_{TH}$ is the threshold voltage of the reset transistor.

The reset level contains an error from pixel to pixel. The error has two components: a fixed error component and a random reset noise. The fixed error results from mismatches between the threshold voltage and transistor sizes. The fixed error is also referred to as fixed pattern noise (FPN). FPN negatively affects the uniformity of the pixel responses in the pixel array. Correction of this non-uniformity may require some type of calibration, for example, by multiplying or adding/subtracting the pixel's signal with a correction amount that is pixel dependent. Conventional technologies to cancel FPN may be referred to as correlated double sampling, uncorrelated double sampling, or offset compensation, and are discussed in more detail below.

The random reset noise (also referred to as reset noise) is generated during the reset process for the pixel. The shot noise in the reset transistor during reset is band-limited by the transconductance of the reset transistor and the sense capacitor. This produces a root-mean-square (RMS) noise at the sense node. This RMS noise is described by the following equation:

$$\sqrt{\frac{kT}{2C_S}},$$

where $C_S$ is the capacitance of the sense capacitor, T is the absolute temperature (Kelvin) of the reset transistor, and k is Boltzman's constant. This RMS noise may be sampled on the sense capacitor when the reset process is complete. As an example, the sampled RMS noise is 643 µV for a typical sense capacitor value of 5 fF at room temperature.

In principle, both the fixed and random error components can be removed by correlated double sampling (CDS). Two voltage measurements are used to perform CDS. A first voltage (the reset value) is the pixel voltage immediately following the reset. This measurement includes both the fixed and random components of the reset level error. The reset value may be stored in either analog or digital form. The second voltage (the integration value) is the pixel voltage after the integration period. The integration value contains the same error components introduced upon reset because the pixel has not been reset again. Additionally, the integration value includes the change in voltage due to the integrated photo current. A CDS circuit (not shown) outside the pixel circuit subtracts the reset value from the integrated value, leaving only the light response term—the photo response voltage, $V_P$. Thus, a CDS circuit removes both the FPN and the random reset noise. The photo response voltage, which is the difference between the integrated value and the reset value, is described by the following equation:

$$V_P = \frac{I_P T_{INT}}{C_S},$$

where $I_P$ is the integrated current on the sense capacitor, $T_{INT}$ is the integration period during which the photo current is integrated on the sense capacitor, and $C_S$ is the capacitance of the sense capacitor.

One drawback of conventional CDS technology is that the reset value is stored for the duration of the integration period, which can approach the frame period. A storage circuit (not shown) holds the value for this entire period. For a typical imager that operates at 30 frames per second, the storage period is 33 ms. Analog sample-and-hold circuits use large and expensive hold capacitors to achieve such a long hold time. Moreover, the storage circuit stores the reset values for the entire array of pixels because each pixel value is used for the resulting image. Although a frame buffer could be used to store the reset values for all the pixels, analog and digital frame buffers are impractical. Analog frame buffers consume significant chip area and draw substantial electrical power.

For this reason, most frame buffers are digital. Digital frame buffers, however, also consume significant chip area and are expensive.

An alternative approach of providing CDS without frame buffers is to use a pinned diode as the photodiode. A pinned diode pixel works much the same way as a CCD pixel. However, the pixels based on pinned diodes require additional semiconductor processing steps and also reduce the fill factor of the pixel.

To circumvent the problems associated with CDS technology, many CMOS imagers employ uncorrelated double sampling (UDS) (although many publications use the term CDS to generically describe both CDS and UDS). A UDS circuit (not shown) uses the pixel voltage of the reset period subsequent to the current integration period, rather than the reset period prior to the integration period. In other words, a UDS circuit subtracts the subsequent reset value from the current integration value. Since the reset for a subsequent frame occurs immediately after the integration measurement of the current frame, the timeframe for storing the integration and reset values is relatively short. Typically, these measurements are held in capacitors in a switched-capacitor subtractor.

Although UDS technology removes the fixed error (FPN) due to the threshold voltage and transistor size mismatches, it does not reduce the random reset noise because the reset noise introduced during the subsequent reset (i.e., for the next frame) is not correlated with the reset noise of the current frame. As a result, UDS technology actually increases total RMS reset noise by a factor of the square root of two because two uncorrelated noise quantities are present after the subtraction. Therefore, UDS is also unsatisfactory to reduce the reset noise.

One attempt to address the unresolved problem of random reset noise is discussed in U.S. Pat. No. 6,697,111 to Kozlowski et al. The U.S. Pat. No. 6,697,111 is directed to a three transistor CMOS pixel circuit coupled to a tapered reset supply that supplies a tapered reset waveform to the pixel circuit to reduce the reset noise. FIG. 2 illustrates the conventional pixel circuit, including a reset (RST) MOS field effect transistor (MOSFET), a row select MOSFET, and a dual-driver MOSFET. The illustrated pixel circuit behaves as a distributed transimpedance amplifier during pixel reset and as a source follower driver during pixel readout.

FIG. 3 illustrates a conventional tapered reset clocking waveform. The illustrated waveform includes a reset voltage of about 3.0 volts that is supplied for a reset period. Then the waveform is gradually and continuously tapered to a sub-threshold voltage of approximately 2.0 volts. The application of the tapered reset waveform to the transimpedance amplifier of the pixel circuit enables the reset noise envelope to decay before the reset switch (i.e., the reset MOSFET) is completely opened.

As noted in U.S. Pat. No. 6,697,111, the timing of the tapered waveform can affect the performance of the pixel circuit and imager. Specifically, decreasing the voltage too quickly reduces the noise suppression benefits of the tapered waveform. On the other hand, decreasing the voltage too slowly may interfere with faster imaging rates such as those used for video imaging. Therefore, the duration of the tapered portion of the waveform may have many potentially negative affects on the performance of the imager. Of course, the gradual slope of the continuously tapered waveform determines, at least in part, the time between the reset and extinguishing the reset noise, and vice versa.

BRIEF DESCRIPTION OF THE DRAWINGS

The present invention is illustrated by way of example, and not by way of limitation, in the figures of the accompanying drawings, in which.

DETAILED DESCRIPTION

In the following description, numerous specific details are set forth, such as examples of specific commands, named components, connections, number of frames, etc., in order to provide a good understanding of several embodiments of the present invention. It will be apparent to one skilled in the art, however, that at least some embodiments of present invention may be practiced without these specific details. In other instances, well known components or methods have not been described in detail but rather in a block diagram in order to avoid unnecessarily obscuring the present invention. Thus, the specific details set forth are merely exemplary. The specific details may be varied from and still be contemplated to be within the spirit and scope of the present invention.

The following detailed description includes circuits, which will be described below. Alternatively, the operations of the circuits may be performed by a combination of hardware, firmware, and software. The term "coupled to," as used herein, may mean coupled directly or indirectly through one or more intervening components. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

A method and apparatus are described to perform low noise reset of a pixel circuit within an active pixel image sensor. A method and apparatus are also described to selectably operate a pixel circuit within an active pixel image sensor in a source follower mode or a common source amplifier mode. A method and apparatus are also described to operate a pixel circuit within an active pixel image sensor in a common gate amplifier mode.

Figure 4:
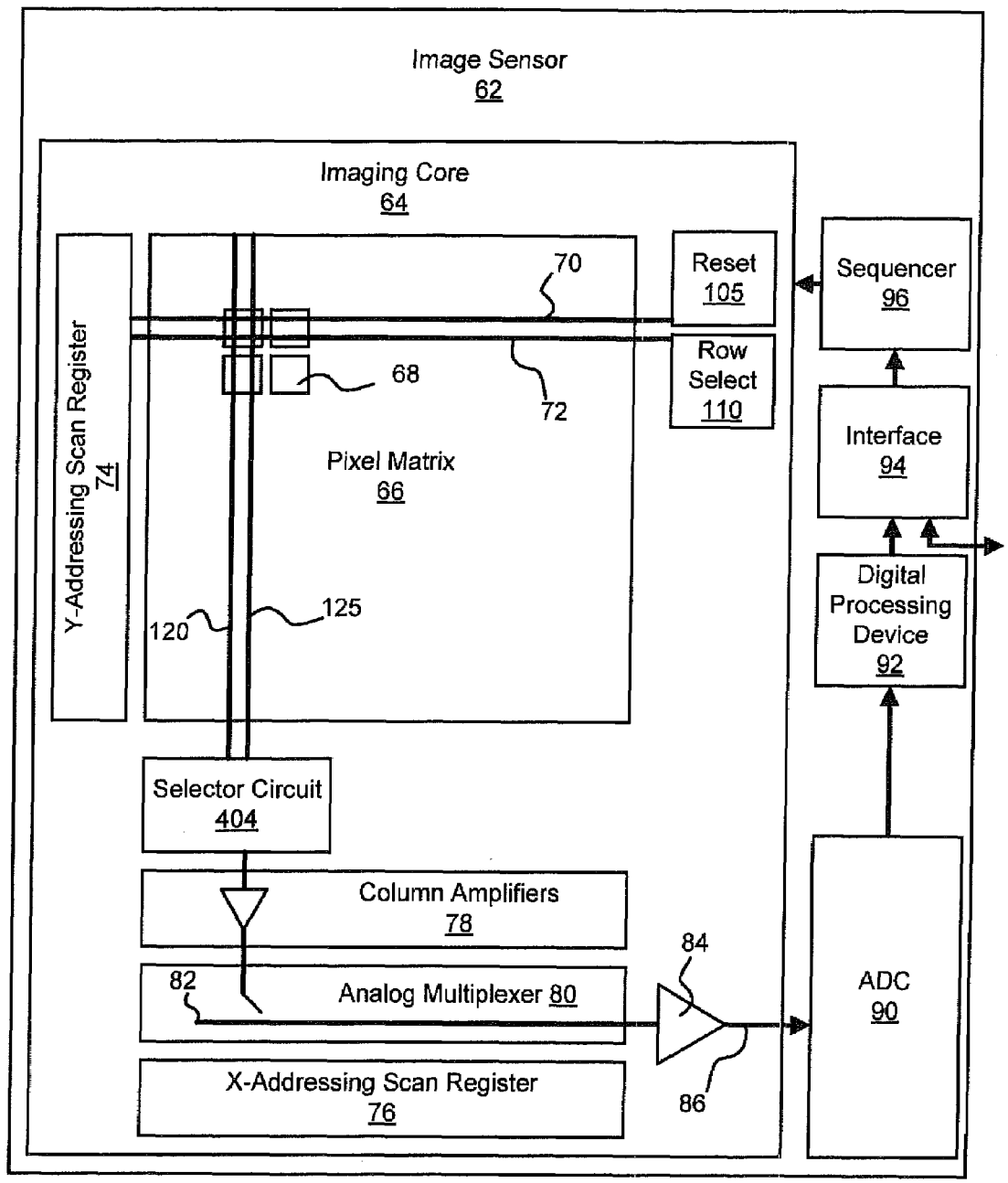
FIG. 4 illustrates one embodiment of an active pixel image sensor.

FIG. 4 illustrates one embodiment of an active pixel image sensor 62. The active pixel image sensor 62 is also shown and described in the context of an imaging system in FIG. 17. In one embodiment, the image sensor 62 is a color complimentary metal-oxide semiconductor (CMOS) image sensor. However, other types of image sensors may be used. For example, the image sensor 62 may be another type of metal-oxide semiconductor (MOS) image sensor. The illustrated image sensor 62 includes an imaging core 64 that includes a pixel matrix 66 and electronic components (imaging electronics) associated with the operation of the imaging core 64. In one embodiment, the imaging core 64 includes a pixel matrix 66 having an array of pixel circuits 68 (also referred to as pixels 68) and the corresponding driving and sensing circuitry for each pixel 68. FIGS. 5-6, 9-10, and 12-15 described below are exemplary embodiments of the pixel circuit 68.

The pixel matrix 66 may be arranged in M columns of pixels 68 by N rows of pixels 68. Although detailed embodiments of the pixels 68 are described below with reference to subsequent figures, each pixel 68 has a width and a length and includes at least a photosensitive element and a readout switch. In certain embodiments, the pixels 68 of the pixel matrix 66 may be linear response pixels 68 (i.e., having linear or piecewise linear slopes).

Each row of pixels 68 is coupled to a reset line 70 and a row select line 72 (also referred to as a select line). The reset line 70 is coupled to a reset supply 105. Similarly, the row select line 72 is coupled to a row select supply 110. Examples of the reset supply 105 and the row select supply 110 are shown and described in more detail with reference to FIG. 5. Additionally, each column of pixels 68 is coupled to a source column 120 and a readout column 125 (also referred to as a readout line). Examples of the source column 120 and the readout column 125 are shown and described in more detail with reference to FIG. 5. In certain embodiments, the source column 120 and the readout column 125 may be coupled to a selector circuit 404, although other embodiments of the image sensor 62 may omit the selector circuit. One example of the selector circuit 404 is shown and described in more detail with reference to FIG. 9. In other embodiments, each pixel 68 within a row may be coupled to other circuitry that couples one or more pixels 68, rows, or columns.

In one exemplary embodiment, the pixel array 66 may have approximately 2,000 columns by 1,500 rows of pixels 68. Each pixel 68 may be an adaptive dynamic range photodiode that is, for example, approximately 3.35 µm by 3.35 µm in size. The resulting pixel array 66 for that size of pixel 68 is about 6.75 mm by 5.08 mm in size. In other embodiments, the pixel array 66 may have more or less pixels 68, rows, or columns, or include other types and/or sizes of pixels 68.

One exemplary sequence of operation of the pixel circuit 68 is as follows: reset, integration, readout, reset, etc. During the reset period, the pixel circuit 68 establishes a known, baseline voltage. During the integration period, the pixel circuit 68 establishes a voltage relative to the light incident on the pixel circuit 68. During the readout period, the pixel circuit 68 transfers the integration voltage (or a voltage from which the integration voltage may be derived) to the readout column 125 for processing. The pixel circuit 68 may continue in this operational sequence while the pixel matrix 66 is being used to generate one or more images. This operational sequence may be understood in light of the subsequent descriptions of the exemplary pixel circuits shown and described in more detail with reference to FIGS. 5-6, 9-10, and 12-15.

In certain embodiments, the driving and sensing circuitry of the imaging core 64 may include one or more Y-addressing scanning registers 74 and one or more X-addressing scanning registers 76 in the form of shift registers or addressing registers. The circuitry of the imaging core 64 also may include buffers and/or line drivers (not shown) for the long reset and select lines. The circuitry of the imaging core 64 also may include column amplifiers 78 that may contain fixed pattern noise (FPN) cancellation and double sampling circuitry (not shown) such as correlated double sampling (CDS) circuitry. In one embodiment, the CDS circuitry is on-chip. The circuitry of the imaging core 64 also may include an analog multiplexer 80 coupled to an output bus 82.

In one embodiment, the Y-addressing scan register 74 addresses via the row select line 72 all of the pixels 68 of a row of the pixel matrix 66 to be read out. In this way, all of the switching elements of the pixels 68 of the selected row may be closed at approximately the same time to place a signal on a corresponding number of readout columns 125. The individual signals are subsequently amplified in the column amplifiers 78. Similarly, one or more filters may be used to improve the integrity of the signal.

In one embodiment, the X-addressing scan register 76 provides control signals to the analog multiplexer 80 to place an output signal (e.g., amplified charges) of the column amplifiers 78 onto the output bus 82. The output bus 82 may be coupled to an output buffer 84 that provides an analog output 86 from the imaging core 64. In another embodiment, additional amplifiers and/or filters (not shown) may enhance the output signal 86 after it has been transmitted from the analog multiplexer 80.

In the depicted embodiment, the output signal 86 from the imaging core 64 is coupled to an analog-to-digital converter (ADC) 90 to convert the analog imaging core output 86 into the digital domain. In one embodiment, the ADC 90 is an on-chip 12-bit column parallel ADC. The ADC 90 is coupled to a digital processing device 92 to process the digital data received from the ADC 90. Such processing may be referred to as imaging processing or post-processing.

The digital processing device 92 may include one or more general-purpose processing devices such as a microprocessor or central processing unit, a controller, or the like. Alternatively, the digital processing device 92 may include one or more special-purpose processing devices such as a digital signal processor (DSP), an application specific integrated circuit (ASIC), a field programmable gate array (FPGA), or the like. In an alternative embodiment, for example, the digital processing device 92 may be a network processor having multiple processors including a core unit and multiple microengines. Additionally, the digital processing device 92 may include any combination of general-purpose processing device(s) and special-purpose processing device(s).

In one embodiment, the digital processing device 92 is coupled to an interface module 94 that handles the input/output (I/O) exchange with other components of the imaging system 10. The interface module 94 also may manage other tasks such as protocols, handshaking, voltage conversions, and so forth.

In one embodiment, the interface module 94 is coupled to a sequencer 96. Additionally, the sequencer 96 may be coupled to one or more components in the image sensor 62 such as, for example, the imaging core 64, the digital processing device 92, and the ADC 90. The sequencer 96 may be a digital circuit that receives externally generated clock and control signals via the interface module 94 and generates internal pulses to drive circuitry (for example, the imaging core 64, the ADC 90, etc.) in the imaging sensor 62.

Although a particular embodiment of the image sensor 62 is described herein, other embodiments of the image sensor 62 may differ from the depicted embodiment in size, components, layout, and so forth. For example, an alternative embodiment of the image sensor 62 may include one ADC 90 for every pixel 68, for every column, or for a subset block of columns. Similarly, one or more other components within the image sensor 62 may be duplicated and/or reconfigured for parallel or enhanced performance. Similarly, the layout of the individual components within the image sensor 62 may be modified to adapt to the number and type of components. In another embodiment, some of the operations performed by the image sensor 62 may be performed in the digital domain instead of the analog domain, and vice versa. One skilled in the art understands that these alternative embodiments are all within the scope of this description.

The pixel matrix 66 and associated imaging electronics within the imaging core 64 may each reside on a different die substrate and in different chip packages. Alternatively, the electronic components within the imaging core 64 may reside in a common chip package on separate integrated circuit die substrates or on a common die substrate.

Figure 5:
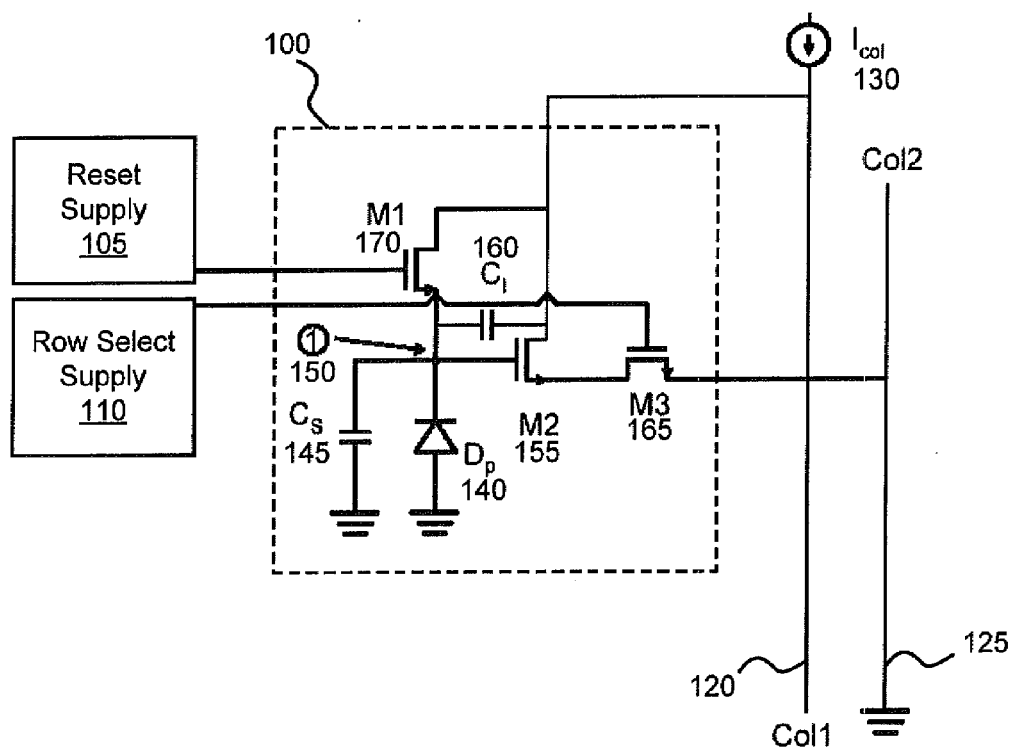
FIG. 5 illustrates one embodiment of an exemplary pixel circuit for low noise reset.

FIG. 5 illustrates one embodiment of an exemplary pixel circuit 100 of the active pixel image sensor 62 of FIG. 4. In particular, the pixel circuit is shown inside the dashed box. The pixel circuit 100 is coupled to a reset supply 105 that supplies a reset signal to the pixel circuit 100. In one embodiment, the reset supply 105 may be a digital-to-analog converter (DAC) to convert a digital control signal into an analog reset signal. One example of a reset signal waveform is shown and described in more detail with reference to FIG. 7.

The illustrated pixel circuit 100 is also coupled to a row select supply 110, a source column 120, $COL_1$, a readout column 125, $COL_2$, and a current source 130, $I_{COL}$, which is coupled to the source column 120. In one embodiment, the readout column 125 is connected to a voltage, for example, ground. As described above, a representative pixel matrix 66 may include thousands of individual pixel circuits 100. To operate the pixel matrix 66, all of the pixel circuits 100 in a column may be coupled together at the source column 120 so that all of the pixel circuits 100 in any row may be operated at about the same time. Similarly, all of the pixel circuits 100 in a column may be coupled together at the readout column 125 so that all of the pixel circuits 100 in a row may simultaneously send readout signals to be processed within the image sensor 62, as described above with reference to FIG. 4.

The illustrated pixel circuit 100 includes a photodiode 140, $D_P$, and a sense capacitor 145, $C_S$, coupled at a sense node 150. In one example, the photodiode 140 may be an adaptive dynamic range photodiode. However, other types of photodiodes may be used. During the integration period, the photodiode 140 is controlled to detect incident light and generate an electrical response. A resulting photo current, $I_P$, is integrated on the sense capacitor 145. In one embodiment, the capacitance of the sense capacitor 150 may be very small. For example, the sense capacitor 150 may have a capacitance of between 2 to 5 fF. However, in other embodiments, the capacitance of the sense capacitor 150 may be smaller or larger. In one embodiment, the integration period may be between approximately 33 ms and 100 ms. In other embodiments, the integration period may be shorter or longer.

The illustrated pixel circuit 100 also includes a sense transistor 155, $M_2$, and an associated capacitance 160, $C_1$, a row select transistor 165, $M_3$, and a reset transistor 170, $M_1$. In one embodiment, the capacitance 160 is parasitic capacitance of the sense transistor 155, including gate-to-drain capacitance and stray capacitance. In another embodiment, the capacitance 160 also may include intentional capacitance. For example, the capacitance 160 may result, at least partially, from a metal-metal overlap. During the integration period, the reset signal ("RESET") from the reset supply 105 and the row select signal ("RS") from the row select supply 110 are both low. Consequently, the reset transistor 170 and the row select transistor 165, respectively, are both off.

At the end of the integration period, the readout period begins when the row select signal RS goes high and the row select transistor 165 turns on. When the row select signal RS is high and the row select transistor 165 is turned on, the sense transistor 155 and the current source 130 coupled to the source column 120 behave as an actively loaded common-source ("CS") amplifier. The input of the CS amplifier is the voltage at the sense node 150. The output of the CS amplifier is the voltage at the source column 120. With the CS amplifier turned on, the integrated photo current on the sense capacitor 145 (established during the integration period) may be completely transferred to the capacitance 160 between the gate and the drain of the sense transistor 155, assuming the open-loop gain of the CS amplifier is large. The amplified signal is subsequently transferred via the row select transistor 165 to the readout column 125 to be processed by the image sensor 62, as described above. While the integration signal is amplified, any noise on the sense node 150 also may be amplified by the CS amplifier.

During the reset phase, either before the integration period or after the readout period, the row select signal RS goes high and the row select transistor 165 turns on. Alternatively, the row select signal RS may remain high and the row select transistor 165 may remain turned on from the readout period. The reset signal RESET also goes high to a reset voltage, $V_{RESET}$. In one embodiment the reset voltage is the driving voltage, $V_{DD}$, for the reset transistor 170. Consequently, the reset transistor 170 turns on and provides negative feedback from the output of the CS amplifier to the input of the CS amplifier. Both the input and the output voltages of the CS amplifier settle to a stable voltage, $V_R$, according to the following equation:

$$V_R = V_{GS2} + V_{DS3} + V_{COL2},$$

where $V_{GS2}$ is the gate-to-source voltage of the sense transistor 155 and $V_{DS3}$ is the drain-to-source voltage of the row select transistor 165 at the drain current $I_{COL}$ from the current source 130. $V_{COL2}$ is the voltage applied to the readout column 125. In one embodiment, the voltage applied to the readout column is ground.

The reset period is complete once the input and output voltages of the CS amplifier stabilize at $V_R$. The integration period begins again when the reset signal RESET returns low, turning off the reset transistor 170. The row select signal RS also goes low, turning off the row select transistor 165. Consequently, the CS amplifier also turns off and another row may be reset in the same manner. Ultimately, the voltage at the sense node 150 is reset to $V_R-\Delta V$, where $\Delta V$ is a change in the voltage due to parasitic capacitance coupling and charge feedthrough at the time the reset signal RESET and the row select signal RS go low.

In response to each readout period, a correlated double sampling (CDS) circuit (not shown) may determine the photo response voltage, $V_P$, that corresponds to the incident light on the photodiode 140. In one embodiment, the CDS circuit measures the difference between the output voltages of the CS amplifier immediately after the reset period and at the end of the integration period, according to the following equation:

$$V_P = V_{RST} - V_{INT},$$

where $V_{RST}$ is the output voltage of the CS amplifier immediately after the reset period and $V_{INT}$ is the output voltage of the CS amplifier at the end of the integration period. In another embodiment, the CDS circuit may use the reset value of the subsequent frame instead of the reset value for the current frame in order to avoid using frame buffers. This technique is also referred to as uncorrelated double sampling (UDS) and is described by the following equation:

$$V_P = V_{(RST+1)} - V_{INT},$$

where $V_{(RST+1)}$ is the output voltage of the CS amplifier of the reset period immediately following the integration period. This difference between the output voltages of the CS amplifier at the subsequent reset period and at the end of the integration period is the photo response voltage, $V_P$, described by the following equation:

$$V_P = \frac{I_P T_{INT}}{C_1},$$

where $I_P$ is the integration current, $T_{INT}$ is the integration period, and $C_1$ is the capacitance 160 shown and described with reference to FIG. 5.

Figure 1:
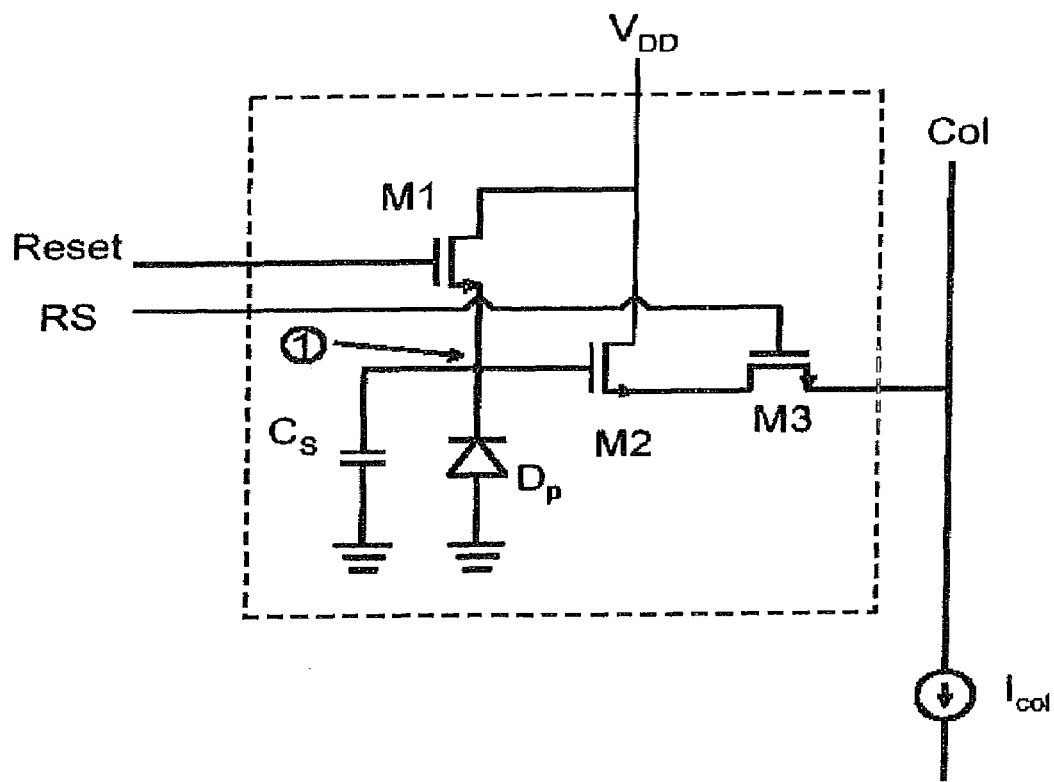
FIG. 1 illustrates a conventional pixel circuit.
Figure 2:
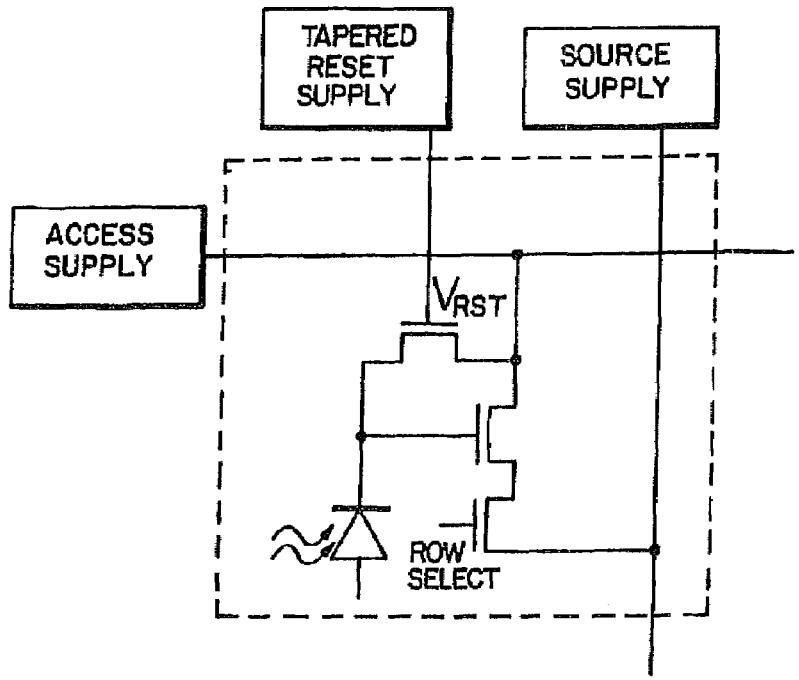
FIG. 2 illustrates another conventional pixel circuit.
Figure 3:
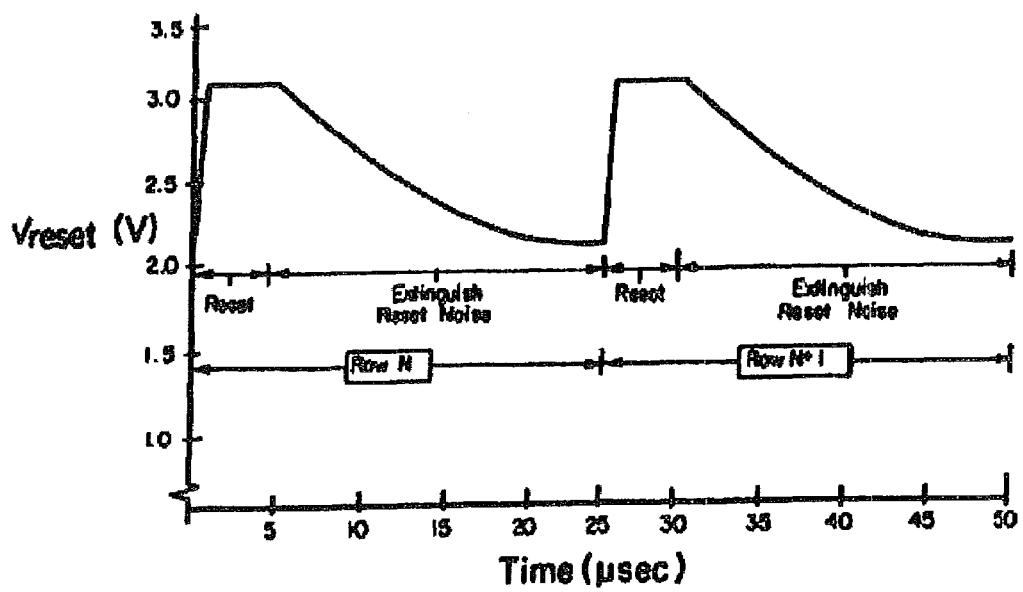
FIG. 3 illustrates a conventional tapered reset clocking waveform used with the conventional pixel circuit of FIG. 2.

Since the capacitance 160 can be made significantly smaller than the capacitance of the sense capacitor 145, the photo response voltage may be relatively high for a given photo current, as compared to the photo response voltage of a conventional pixel circuit such as the pixel circuit of FIG. 1. Therefore, the responsivity (i.e., how much the output changes relative to a change in the input) of the pixel circuit 100 is significantly improved compared with a conventional image sensor such as the pixel circuit of FIG. 1.

Additionally, the reset noise of the pixel circuit 100 may be effectively suppressed if the bandwidth of the combined RC circuit including the ON resistance of the reset transistor 170 and the capacitance of the sense capacitor 145 is significantly lower than the bandwidth of the CS amplifier during the reset period. More particularly, the CS amplifier, in conjunction with the negative feedback provided by the reset transistor 170, corrects the noise at the sense node 150. The bandwidth of the RC circuit can be made low by supplying a reset voltage $V_{RESET}$ to the reset transistor 170 so that the reset transistor 170 is biased in a deep subthreshold region during the reset period. Alternatively, the waveform of the reset signal RESET can be configured to fall slowly at the end of the reset period so that the reset transistor 170 spends enough time in the deep subthreshold region while the reset signal RESET is lowered. One example of such a reset signal waveform is a ramp that goes down from $V_{DD}$ to ground in a period of, for example, a few microseconds. Another example of a reset signal waveform is shown and described in more detail with reference to FIG. 7.

Figure 6:
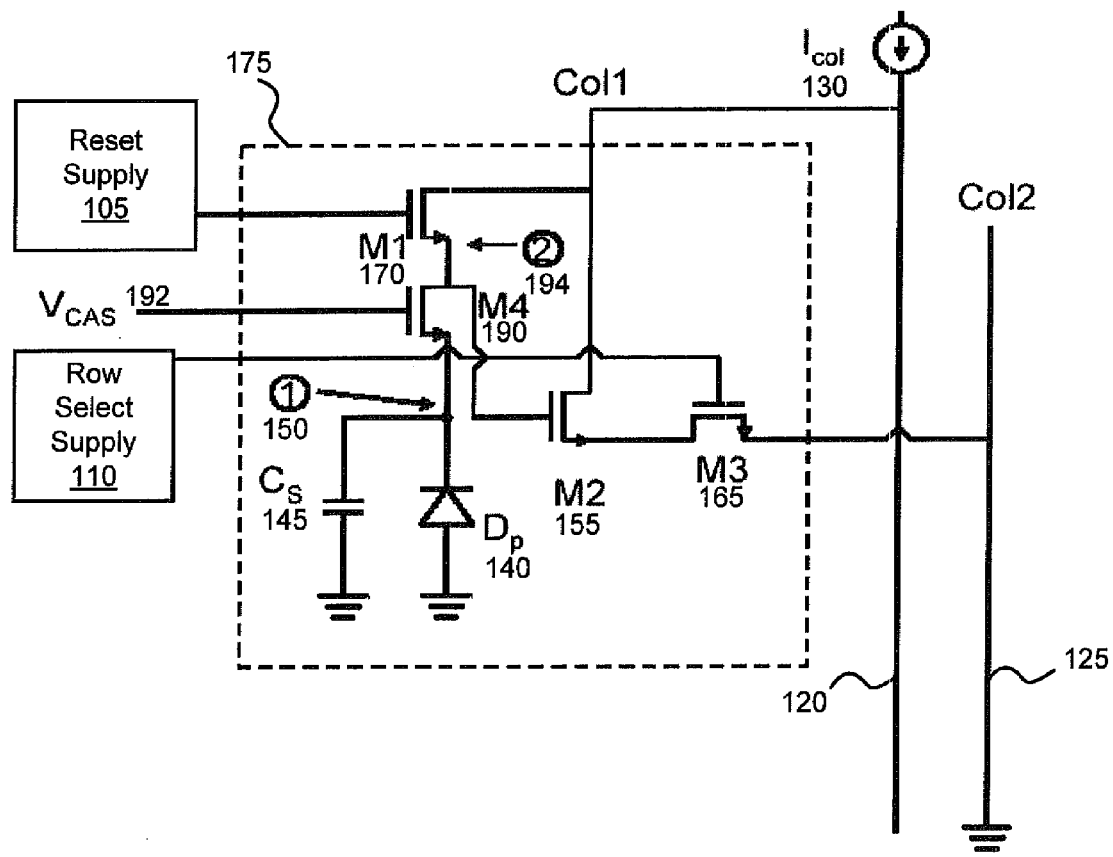
FIG. 6 illustrates another embodiment of an exemplary pixel circuit for low noise reset.

FIG. 6 illustrates another embodiment of an exemplary pixel circuit 175 of the active pixel image sensor 62 of FIG. 4. The illustrated pixel circuit 175 includes many of the same components as the pixel circuit 100 of FIG. 5. For convenience and clarity, like components are identified by the same reference numbers and operate in a similar or identical manner as described above with reference to FIG. 5, except for the differences described below.

The illustrated pixel circuit 175 also includes a common-gate transistor 190, $M_4$, which receives a gate voltage, $V_{CAS}$, from a third input 192. The third input 192 controls the gate voltage to control the charge flow from the sense node 150 to a floating node 194 between the drain of the common-gate transistor 190 and the source of the reset transistor 170. This configuration is similar to a configuration for pixel circuits based on pinned diodes. In the simplest method of operation, the gate voltage may be maintained at a constant voltage, which allows the pixel circuit 175 to operate similar to the pixel circuit 100 described above. However, the common-gate transistor 190 isolates the floating node 194 from the photodiode 140. Isolating the floating node 194 from the photodiode 140 allows a larger photodiode 140 to be used in the pixel circuit 175 because the responsivity of the photodiode 140 is inversely proportional to the capacitance at the floating node 194 (or the sense node 150 in the absence of the common-gate transistor 190). This mode of operation may be referred to as a cascode mode.

Figure 7:
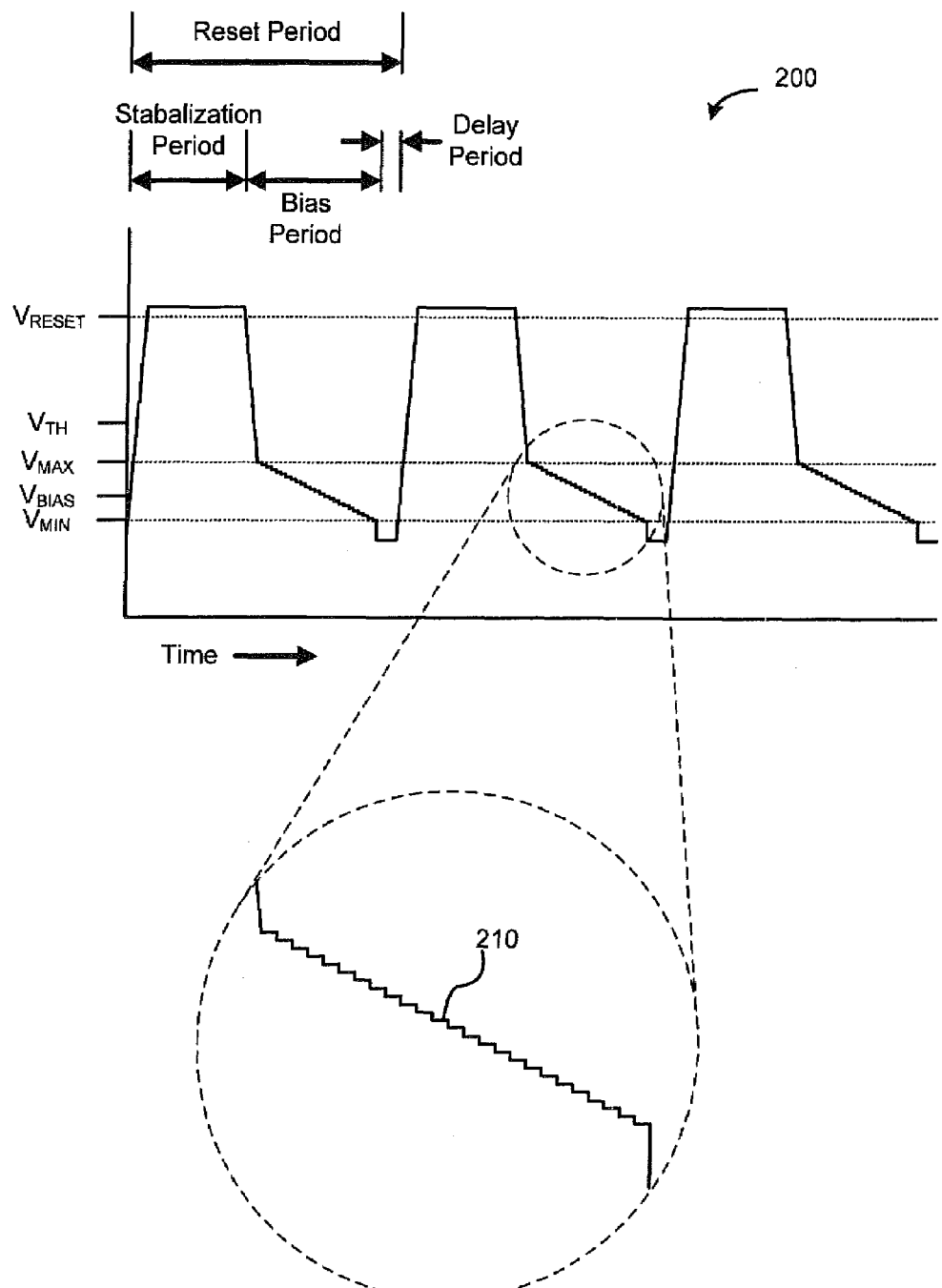
FIG. 7 illustrates one embodiment of a low noise reset clocking waveform.

FIG. 7 illustrates one embodiment of a low noise reset clocking waveform 200. The application of the depicted waveform 200 to the reset transistor 170 of the pixel circuit 100, for example, reduces the reset noise within the pixel circuit 100. Although reference is made to the pixel circuit 100, the waveform 200 also may be equally applicable to other pixel circuits. In particular, applying the waveform 200 to the reset transistor 170 biases the reset transistor 170 in a deep subthreshold region during the reset period. Consequently, the bandwidth of the RC circuit including the reset transistor 170 and the sense capacitor 145 is much lower than the bandwidth of the CS amplifier during the reset period.

The illustrated waveform 200 shows multiple cycles. In one embodiment, each cycle may be sequentially applied to a different row of pixels 68 within the pixel matrix 66. When the reset period begins for a given row of pixels 68, the reset supply 105 supplies a reset voltage, $V_{RESET}$, to the reset transistor 170 for a stabilization period. This allows the voltage on the sense node 150 to stabilize, as described above.

The reset supply 105 then supplies a reset voltage that is a predetermined voltage. In one embodiment, the predetermined voltage is a subthreshold voltage below a threshold voltage, $V_{TH}$, for the reset transistor 170.

In one embodiment, the reset supply 105 drops the reset voltage from $V_{RESET}$ to a maximum voltage, $V_{MAX}$, within a subthreshold range. Dropping the reset voltage from $V_{RESET}$ to $V_{MAX}$, instead of gradually ramping or tapering the reset voltage down, reduces the amount of time the reset signal takes to reset a single row of pixels 68 and reduce or eliminate the reset noise.

Once the reset signal is dropped to the subthreshold voltage $V_{MAX}$, the reset supply 105 supplies a decreasing staircase waveform 210 to reduce the reset voltage from $V_{MAX}$ to a minimum voltage, $V_{MIN}$, within the subthreshold range. The subthreshold range includes a bias voltage, $V_{BIAS}$, at which the reset noise of the pixel circuit 68 is reduced or eliminated. The reset supply 105 supplies the decreasing staircase waveform 210 during a bias period. In one embodiment, a delay period follows the bias period. The reset supply 105 may supply a low voltage or no voltage during the delay period. In another embodiment, the reset supply 105 may immediately begin, without a delay period, to generate the reset voltage, $V_{RESET}$, to reset a subsequent row of pixels 68.

Although a specific waveform is depicted in FIG. 7 and described herein, other waveforms having similar characteristics also may be implemented to effectively reduce the reset noise of a pixel circuit such as the pixel circuit 100. For example, the reset supply 105 may generate and supply a decreasing ramp waveform, a decreasing taper waveform, a decreasing step waveform, or another similar waveform. In another embodiment, the reset supply 105 may generate and supply a combination of these waveforms, such as a step-ramp waveform, a step-taper waveform, and so forth. In another embodiment, the reset supply 105 may drop the reset voltage from $V_{RESET}$ to $V_{MAX}$, where $V_{MAX}$ is above the threshold voltage. Then the reset supply 105 may decrease the reset voltage down below the threshold voltage to $V_{MIN}$.

Figure 8:
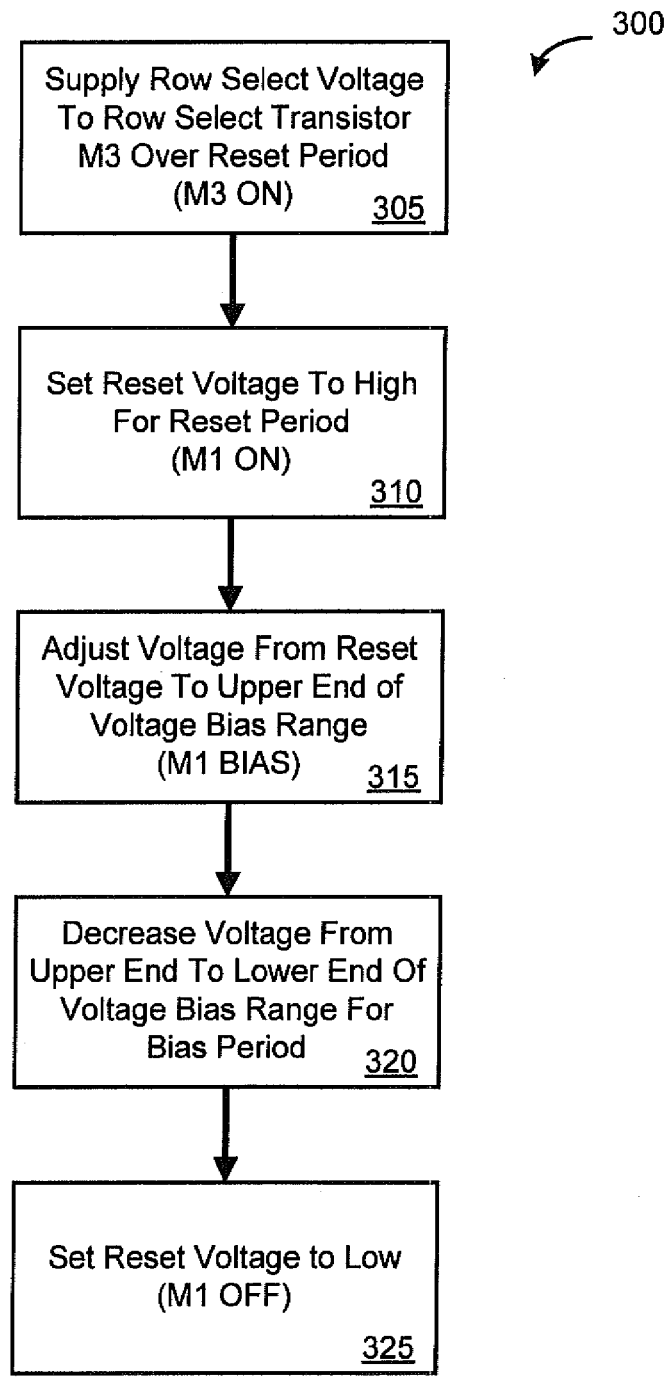
FIG. 8 illustrates one embodiment of a pixel reset method using the low noise reset clocking waveform of FIG. 7.

FIG. 8 illustrates one embodiment of a pixel reset method 300 using the low noise reset clocking waveform 200 of FIG. 7. The pixel reset method 300 may be implemented, for example, in conjunction with the reset supply 105 and the pixel circuit 100. Additionally, the pixel reset method 300 may be facilitated by the processor 92, the sequencer 96, or other components within the image sensor 62.

The illustrated pixel reset method 300 begins and the row select supply 110 supplies 305 a row select signal RS to the row select transistor 165. This turns the row select transistor 165 on and allows the sense transistor 155 and the current source 130 to behave as a CS amplifier. The reset supply 105 also supplies 310 a reset signal to the reset transistor 170. In one embodiment, the reset supply 105 supplies a reset voltage, $V_{RESET}$, to the reset transistor 170 for a stabilization period. The reset supply 105 subsequently adjusts 315 the reset voltage from $V_{RESET}$ to a predetermined voltage, $V_{MAX}$. In one embodiment, the reset supply 105 drops the reset voltage as shown in FIG. 7. In another embodiment, the reset supply 105 may adjust the reset voltage in another manner, as described above.

After adjusting the reset voltage to the predetermined voltage, such as below the threshold voltage, $V_{TH}$, the reset supply 105 decreases 320 the reset voltage from $V_{MAX}$ to $V_{MIN}$ within the subthreshold range. In one embodiment, the reset supply 105 supplies a decreasing staircase waveform 210 as shown in FIG. 7. In other embodiments, the reset supply 105 may supply other signal waveforms during the bias period. After decreasing the reset voltage over the subthreshold range, which includes the bias voltage, the reset supply 105 may set the reset voltage to low (or OFF), turning the reset transistor 170 off and ending the pixel reset method 300.

Figure 9:
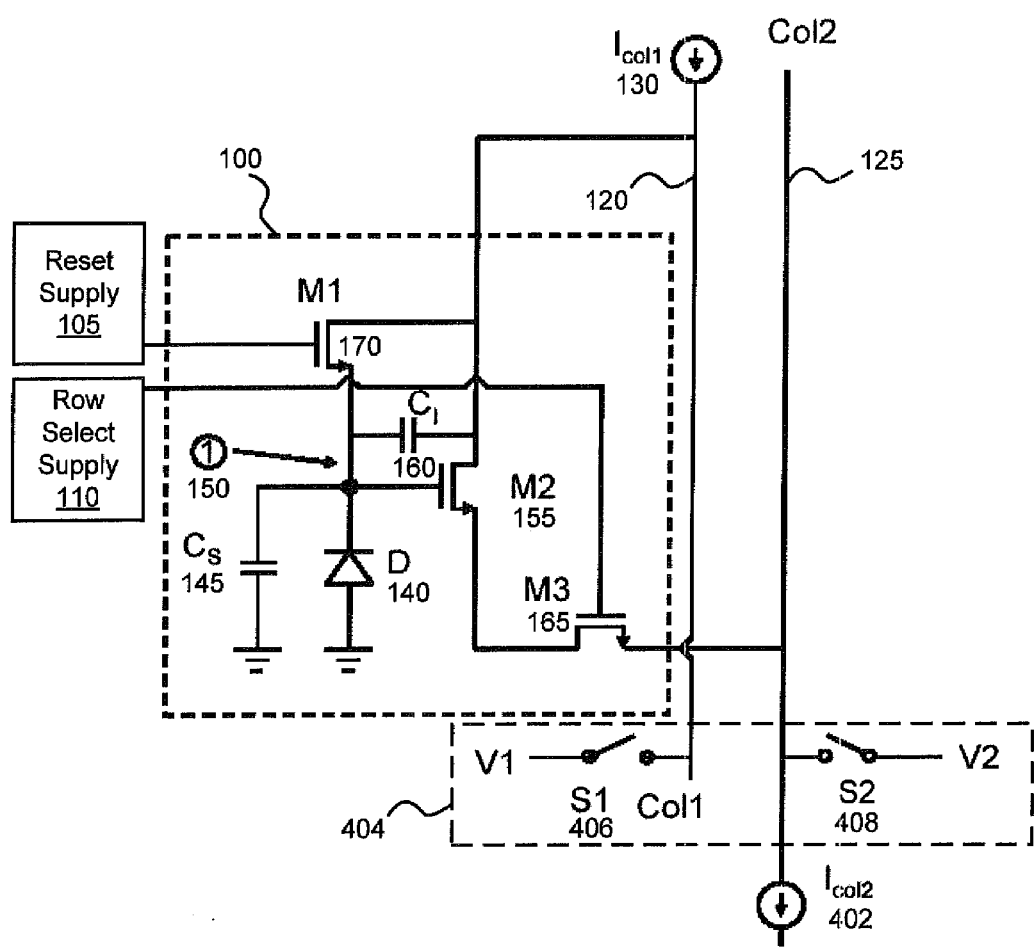
FIG. 9 illustrates one embodiment of an exemplary pixel circuit with selectable source follower and common source amplifier modes.

FIG. 9 illustrates one embodiment of the exemplary pixel circuit 100 with selectable source follower and common source amplifier modes. The illustrated pixel circuit 100 (within the indicated dashed box) is identical to the pixel circuit 100 of FIG. 5, although the pixel circuit 100 of FIG. 9 may be different in other embodiments. For convenience and clarity, like components are identified by the same reference numbers and operate in a similar or identical manner as described above with reference to FIG. 5.

The illustrated pixel circuit 100 is coupled to the source column 120 and readout column 135, similar to the pixel circuit 100 of FIG. 5. However, a second current source 402, $I_{COL2}$, is coupled to the readout column 125 in FIG. 9. In one embodiment, the first and second current sources 130, 402 are controllable. The source column 120 and readout column 125 are coupled to a selector circuit 404 having a first selector 406, $S_1$, and a second selector 408, $S_2$, respectively. In one embodiment, the first and second selectors 406, 408 are column switches. The first selector 406 couples the source column 120 to a first voltage, $V_1$, such as $V_{DD}$. Similarly, the second selector 408 couples the readout column 125 to a second voltage, $V_2$, such as ground. In one embodiment, the first selector 406 and second selector 408 are closed exclusive of one another so that only one of the selectors 406, 408 is closed at a given time. Table 1 summarizes the potential operational modes of the pixel circuit 100 according to the states of the first and second selectors 406, 408.

The pixel circuit 100 operates in one of two modes: a source follower mode and a common source ("CS") amplifier mode. The mode of operation is determined by the states of the first and second selectors 406, 408. When the first voltage is coupled to the source column 120 via the first selector 406, the pixel circuit 100 operates in the source follower mode. The operation of the pixel circuit 100 in the source follower mode is substantially similar to the operation of the conventional pixel circuit shown in FIG. 1. When the second voltage is coupled to the readout column 125 via the second selector 408, the pixel circuit 100 operates in the CS amplifier mode. The operation of the pixel circuit 100 in the CS amplifier mode is substantially similar to the operation of the pixel circuit 100 of FIG. 5, described above.

TABLE 1

Operational Modes of the Pixel Circuit 100.

|  |  | Selector S1 | |
| --- | --- | --- | --- |
|  |  | ON | OFF |
| Selector S2 | ON | N/A | Common Source Amplifier |
|  | OFF | Source Follower | N/A |

In another embodiment, the pixel circuit 100 may operate in a source follower mode during part of the operation of the pixel circuit 100 and in a CS amplifier mode during another part of the operation of the pixel circuit 100. As one example, the pixel circuit 100 may operate in the CS amplifier mode during a reset period and in the source follower mode during the readout period. Table 2 summarizes some of the combinations of operational modes that may be implemented during one cycle of the imaging sensor 62.

In this way, the pixel circuit 100 allows flexibility with regard to the operations of the image sensor 62 based on the states of the first and second selectors 406, 408. In one embodiment, the states of the first and second selectors 406, 408 may be determined automatically within the imaging system 10. For example, the imaging system 10 may detect ambient light conditions via a light meter (not shown) or via the incident light on the pixel array 66 and set the states of the first and second selectors 406, 408 based on the detected light levels. One example of such automatic selection is shown and described in more detail with reference to FIG. 11. In another embodiment, a user may manually determine and set the first and second selectors 406, 408 according to a user selection.

TABLE 2

Selectable Modes of Operation.

|  | MODE | | | |
| --- | --- | --- | --- | --- |
| RESET | Source Follower | Source Follower | Common Source Amplifier | Common Source Amplifier |

TABLE 2-continued

Selectable Modes of Operation.

| | MODE | |
|---|---|---|
| READOUT | Common Source Amplifier | Source Follower |

Figure 10:
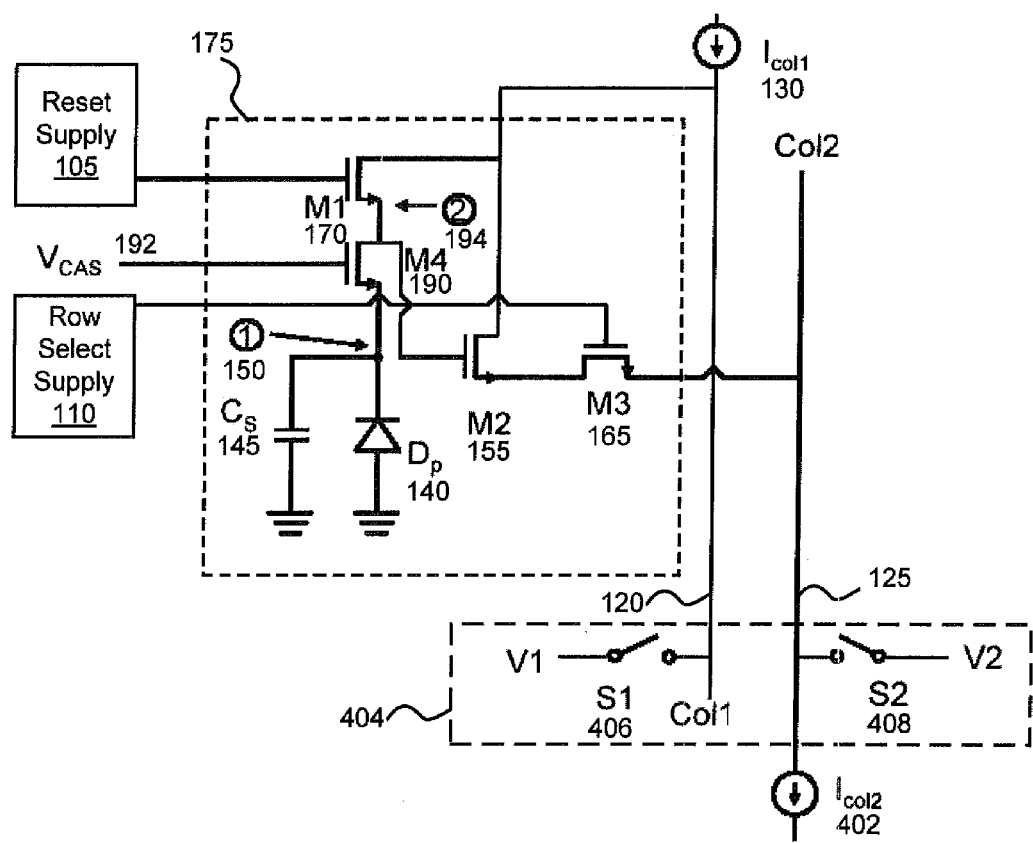
FIG. 10 illustrates another embodiment of an exemplary pixel circuit with selectable source follower and common source amplifier modes.

FIG. 10 illustrates another embodiment of an exemplary pixel circuit 175 with selectable source follower and common source amplifier modes. The illustrated pixel circuit 175 (within the indicated dashed box) is identical to the pixel circuit 175 of FIG. 6, although the pixel circuit 175 of FIG. 10 may be different in other embodiments. For convenience and clarity, like components are identified by the same reference numbers and operate in a similar or identical manner as described above with reference to FIG. 6.

Like the pixel circuit 175 of FIG. 6, the pixel circuit 175 of FIG. 10 includes a common-gate transistor 190, which receives a gate voltage from a third input 192. As described above, the common-gate transistor 190 isolates the floating node 194 from the photodiode 140. Isolating the floating node 194 from the photodiode 140 allows a larger photodiode 140 to be used in the pixel circuit 175 because the responsivity of the photodiode 140 is inversely proportional to the capacitance at the floating node 194 (or the sense node 150 in the absence of the common-gate transistor 190). This mode of operation may be referred to as a cascode mode.

Figure 11:
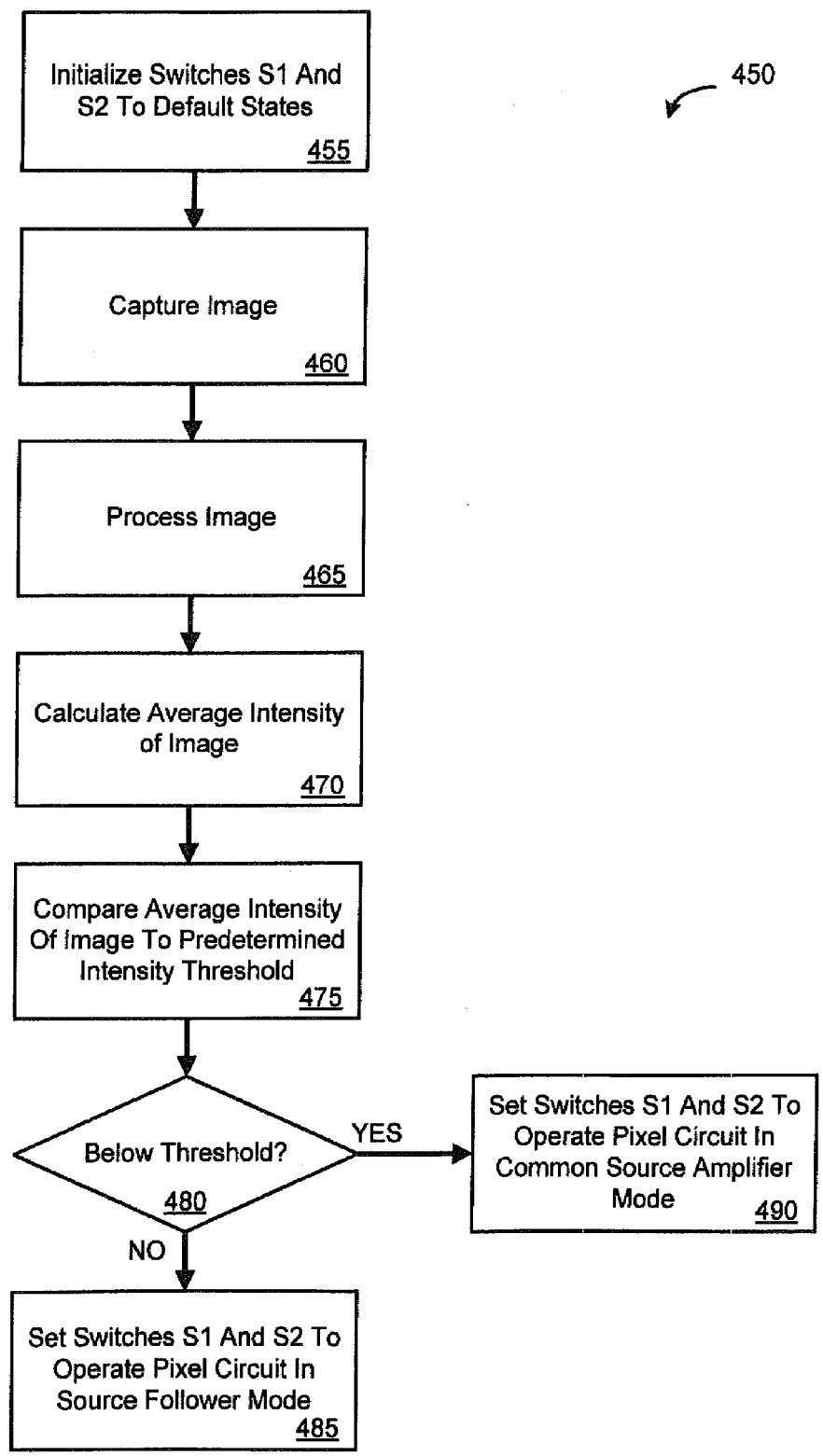
FIG. 11 illustrates one embodiment of a mode selection method for automatically selecting a source follower or a common source amplifier mode.

FIG. 11 illustrates one embodiment of a mode selection method 450 for automatically selecting a source follower mode or a CS amplifier mode. The mode selection method 450 is compatible with the pixel circuit 100 of FIG. 9 and the pixel circuit 175 of FIG. 10. Furthermore, the mode selection method 450 may be facilitated by, for example, the processor 92, the sequencer 96, or other components within the image sensor 62.

The illustrated mode selection method 450 begins and the selector circuit 404 initializes 455 the first and second selectors 406, 408 to default states. For example, the selector circuit 404 may initialize the first selector 406 to OFF and the second selector 408 to ON to operate the pixel circuit 100 in the CS amplifier mode. Alternatively, the selector circuit 404 may initialize the first selector 406 to ON and the second selector 408 to OFF to operate the pixel circuit 100 in the source follower mode.

The imaging sensor 62 then captures 460 an image and processes 465 the image, as described above. The processor 92 then calculates 470 the average light intensity of the processed image. Although, the mode selection method 450 described herein uses the average light intensity parameter, other embodiments may use other parameters such as the maximum intensity or an intensity histogram. After calculating the average light intensity of the image, the processor 92 then compares 475 the average light intensity to a predetermined light intensity threshold. In one embodiment, the predetermined light intensity threshold is established by the manufacturer of the image sensor 62. In another embodiment, the predetermined light intensity threshold is selected or established by a user. The predetermined light intensity threshold is stored, for example, in the storage subsystem 26 or on a ROM in the processor 92 or the ASIC 30.

If the comparison results in a determination 480 that the calculated intensity of the image is not below the predetermined intensity threshold, the selector circuit 404 sets 485 the first and second selectors 406, 408 to operate the pixel circuit 100 in the source follower mode. However, if the comparison results in a determination 480 that the calculated intensity of the image is below the predetermined intensity threshold, the selector circuit 404 sets 490 the first and second selectors 406, 408 to operate the pixel circuit 100 in the CS amplifier mode. In one embodiment, the processor 92 communicates the state instructions to the selector circuit 404 via the interface 94 and sequencer 96. In another embodiment, the processor 92 may communicate the state instructions directly to the pixel matrix 66. The depicted mode selection method 450 then ends.

Figure 12:
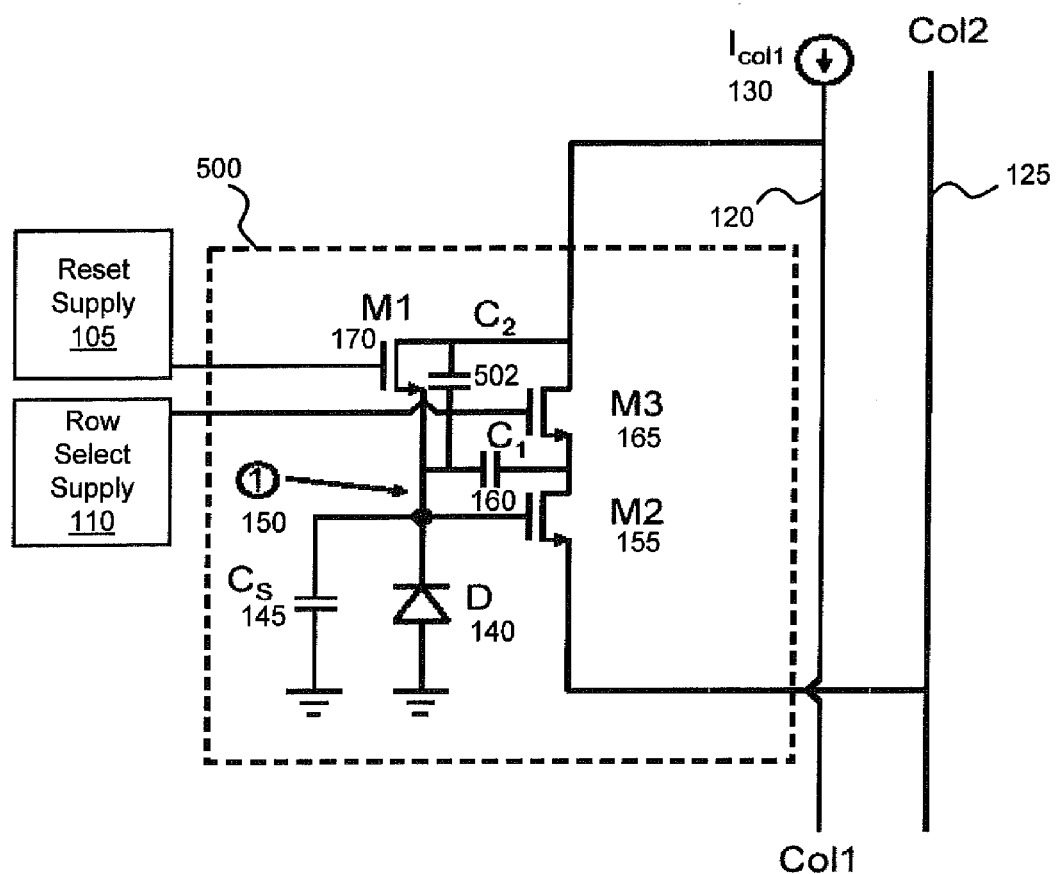
FIG. 12 illustrates one embodiment of an exemplary pixel circuit with a common gate amplifier mode.

FIG. 12 illustrates one embodiment of an exemplary pixel circuit 500 with a common gate amplifier mode. The illustrated pixel circuit 500 is similar in many ways to the pixel circuit 100 of FIG. 5 and the pixel circuit 100 of FIG. 9. For convenience and clarity, like components are identified by the same reference numbers and operate in a similar or identical manner as described above with reference to FIGS. 5 and 9, except for the following differences.

The illustrated pixel circuit 500 specifically differs from the pixel circuit 100 of FIGS. 5 and 9 in that the row select transistor 165, $M_3$, of the pixel circuit 500 is interposed between the source column 120 and the sense transistor 155, rather than between the sense transistor 155 and the readout column 125. Additionally, the pixel circuit 500 includes a second capacitance 502, $C_2$, that spans the drain and source of the reset transistor 170. In one embodiment, the capacitance 502 is parasitic wiring capacitance. In another embodiment, the capacitance 502 also may include intentional capacitance. For example, the capacitance 502 may result, at least partially, from a metal-metal overlap.

Although the row select transistor 165 operates like a switch when high and low voltages are applied to the gate of the row select transistor 165, the row select transistor 165 of the pixel circuit 500 also operates as a common ("CG") gate amplifier when a bias voltage, $V_{BIAS}$, is applied to the gate. Note that the bias voltage for the reset transistor 170, discussed above with reference to FIGS. 5-8, is not necessarily the same in value or character as the bias voltage for the row select transistor 165, discussed herein with reference to FIGS. 12-16. When the row select transistor 165 operates as a switch, the pixel circuit 500 operates in substantially the same way as the pixel circuit 100 of FIG. 5, taking the second capacitance 502 into account. For example, the photo response voltage, $V_P$, is described by the following equation:

$$V_P = \frac{I_P T_{INT}}{C_1 + C_2},$$

where $I_P$ is the integration current, $T_{INT}$ is the integration period, and $C_1$ and $C_2$ are the capacitances 160, 502 shown and described with reference to FIG. 12. Note that this is the same equation that is associated with the pixel circuit of FIG. 5, except that $C_1$ is replaced with the parallel capacitance of $C_1$ and $C_2$.

However, when the row select transistor 165 operates in a CG amplifier mode, the sense transistor 155 and the row select transistor 165 may operate in combination as an actively loaded cascode amplifier. In this configuration, the photo response voltage, $V_P$, is independent of the capacitance $C_1$, as described by the following equation:

$$V_P = \frac{I_P T_{INT}}{C_2},$$

where $I_P$ is the integration current, $T_{INT}$ is the integration period, and $C_2$ is the capacitances 502 shown and described with reference to FIG. 12. In this way, the effects of the capacitance $C_1$ are reduced or eliminated with regard to the photo response voltage. Whereas a relatively large capacitance for $C_1$ in the pixel circuit 100 of FIG. 5 would reduce the overall gain and effectiveness of the low noise reset, the size of the capacitance $C_1$ does not affect the photo response voltage in the pixel circuit 500 of FIG. 12.

Furthermore, it may be useful to have a small capacitance of $C_1$ during a reset period and an increased capacitance of $C_1$ during a readout period. By controlling the voltage supplied to the row select transistor 165 by the row select supply 110, the effect of the capacitance $C_1$ can be adapted to different periods and operations. For example, the row select supply 110 may supply a high voltage to the row select transistor 165 during both reset and readout periods. Alternatively, the row select supply 110 may supply a bias voltage to the row select transistor 165 during the reset period and a high voltage during the readout period.

The physical size of the pixel circuit 500 also may be different from the physical size of the pixel circuit 100 of FIG. 5. In one embodiment, locating the row select transistor 165 between the source column 120 and the sense transistor 155, as shown in FIG. 12, may decrease the overall surface area of the pixel circuit 500 relative to the pixel circuit 100. For example, the surface area of the pixel circuit 500 may be 2.8 Mm squared compared to 3.35 Mm squared for the pixel circuit 100 of FIG. 5.

Figure 13:
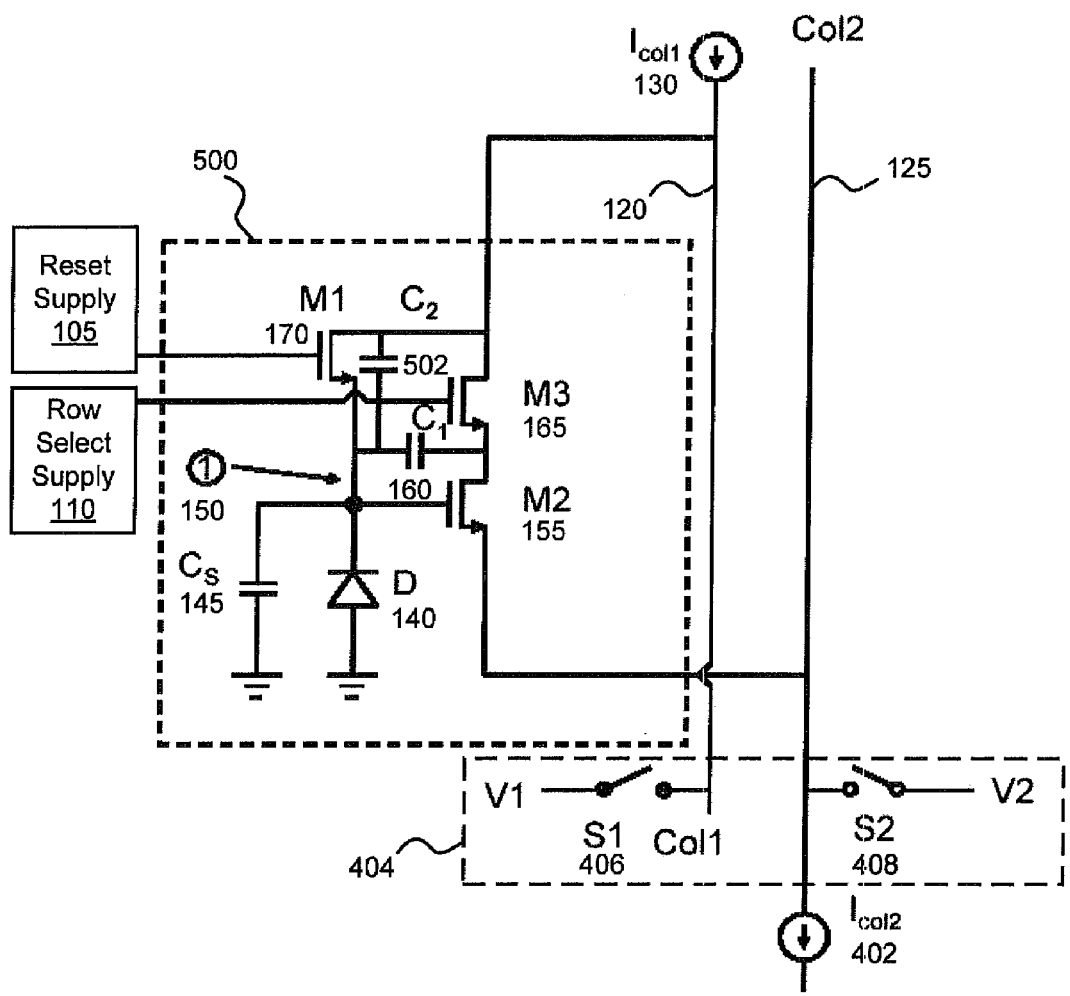
FIG. 13 illustrates another embodiment of an exemplary pixel circuit with a common gate amplifier mode.

FIG. 13 illustrates another embodiment of an exemplary pixel circuit 500 with a common gate amplifier mode. The illustrated pixel circuit 500 identical to the pixel circuit 500 of FIG. 12, although the pixel circuit 500 of FIG. 13 may be different in other embodiments. For convenience and clarity, like components are identified by the same reference numbers and operate in a similar or identical manner as described above with reference to FIG. 12.

The illustrated pixel circuit 500 is coupled to the source column 120 and readout column 135, similar to the pixel circuit 100 of FIG. 5. However, a second current source 402, $I_{COL2}$, is coupled to the readout column 125 in FIG. 13, similar to the coupling illustrated in FIG. 9. In one embodiment, the first and second current sources 130, 402 are controllable. The source column 120 and readout column 125 are coupled to a selector circuit 404 that is identical to the selector circuit 404 of FIG. 9, although the selector circuit 404 of FIG. 13 may be different in other embodiments. As described above, the first selector 406 couples the source column 120 to a first voltage, $V_1$, such as $V_{DD}$, and the second selector 408 couples the readout column 125 to a second voltage, $V_2$, such as ground.

The pixel circuit 500 operates in one of two modes according to the states of the first and second selectors 406, 408. The operation of the pixel circuit 500 in these two modes may be concurrent with the operation of the pixel circuit 500 in the CG amplifier mode. In this way, the pixel circuit 500 allows additional flexibility, relative to the pixel circuit 500 of FIG. 12, with regard to the operations of the image sensor 62 based on the selected states of the first and second selectors 406, 408. As described above, the states of the first and second selectors 406, 408 may be determined automatically or manually.

Figure 14:
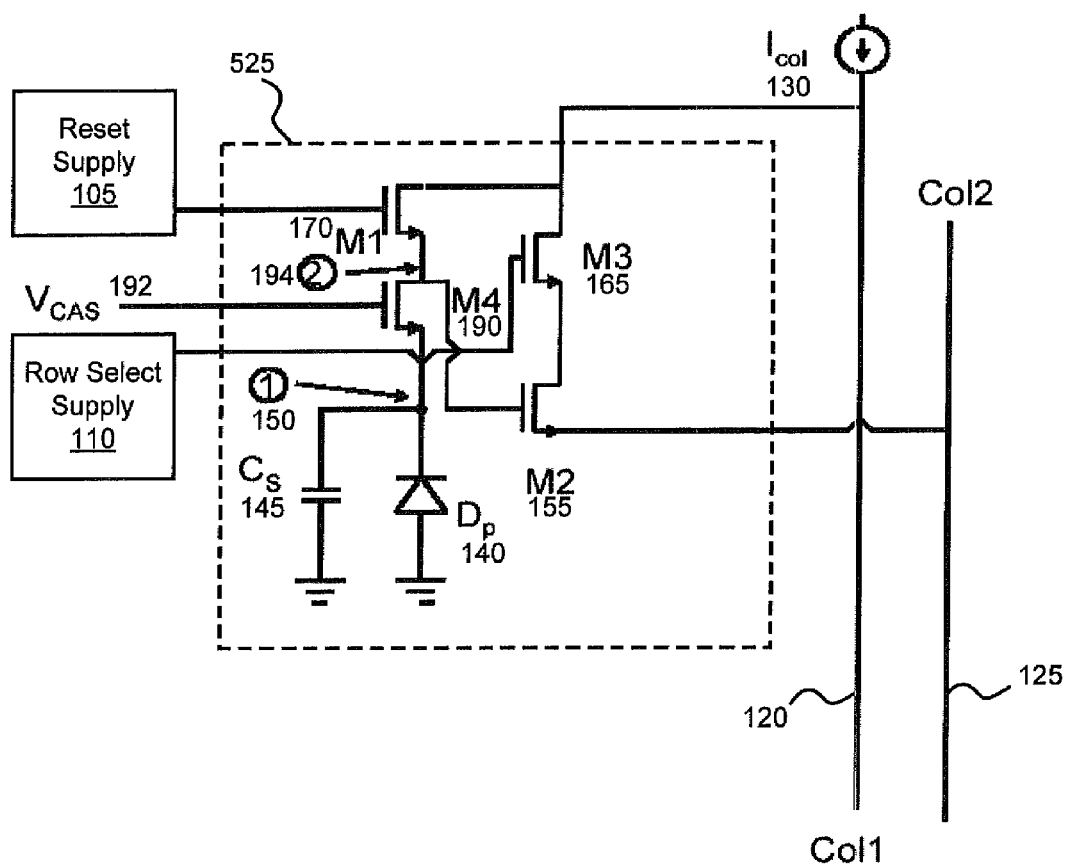
FIG. 14 illustrates another embodiment of an exemplary pixel circuit with a common gate amplifier mode.

FIG. 14 illustrates another embodiment of an exemplary pixel circuit 525 with a common gate amplifier mode. The illustrated pixel circuit 525 (within the indicated dashed box) is similar, although not identical, to the pixel circuit 500 of FIGS. 12 and 13. For convenience and clarity, like components are identified by the same reference numbers and operate in a similar or identical manner as described above with reference to FIGS. 12 and 13, except for the differences described below.

The pixel circuit 525 of FIG. 14 includes a common-gate transistor 190, which receives a gate voltage from a third input 192. As described above, with reference to the common gate transistor 190 of FIGS. 6 and 10, the common-gate transistor 190 isolates the floating node 194 from the photodiode 140. Isolating the floating node 194 from the photodiode 140 allows a larger photodiode 140 to be used in the pixel circuit 175 because the responsivity of the photodiode 140 is inversely proportional to the capacitance at the floating node 194 (or the sense node 150 in the absence of the common-gate transistor 190). This mode of operation may be referred to as a cascode mode.

Figure 15:
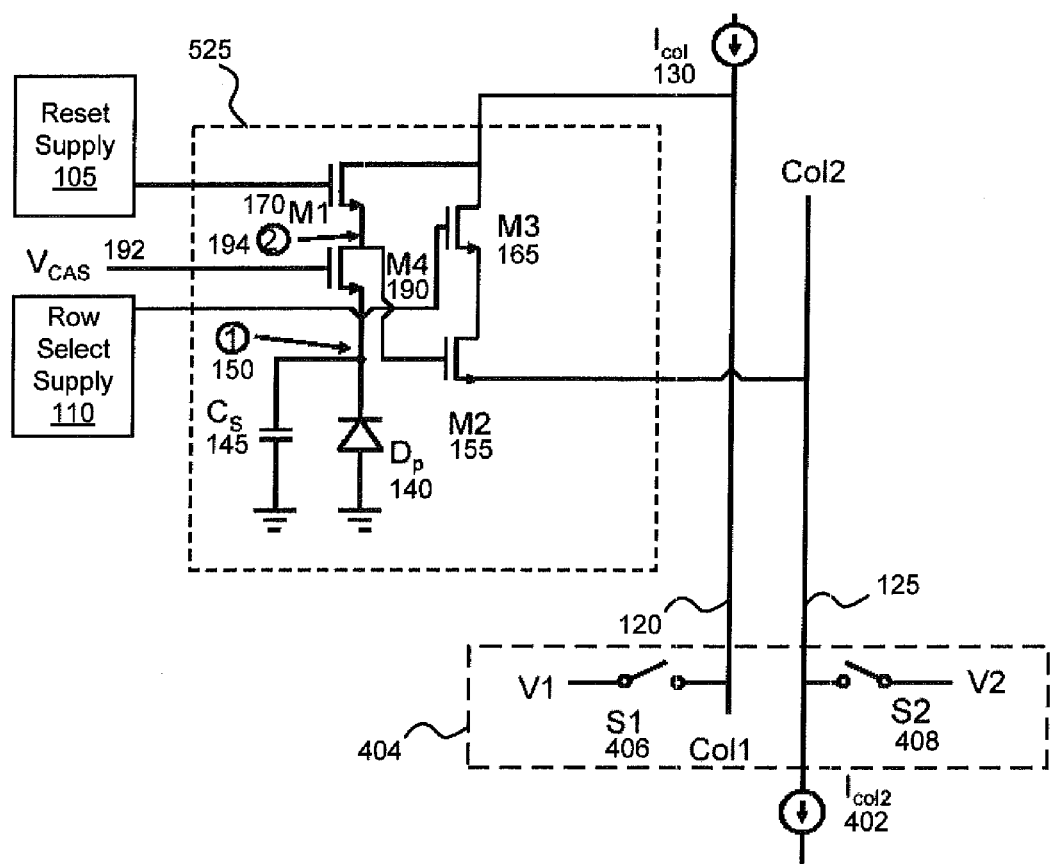
FIG. 15 illustrates another embodiment of an exemplary pixel circuit with a common gate amplifier mode.

FIG. 15 illustrates another embodiment of an exemplary pixel circuit 525 with a common gate amplifier mode. Similar to the pixel circuit 525 of FIG. 14, the pixel circuit 525 of FIG. 15 includes a common gate transistor 190, supplied by the third input 192, to isolate the floating node 194 from the photodiode 140. The pixel circuit 525 of FIG. 15 is also coupled to a selector circuit 404 that is identical to the selector circuit 404 of FIGS. 9, 10, and 13. As described above, the selector circuit 404 allows the pixel circuit 525 to operate in either a source follower mode or a CS amplifier mode.

Figure 16:
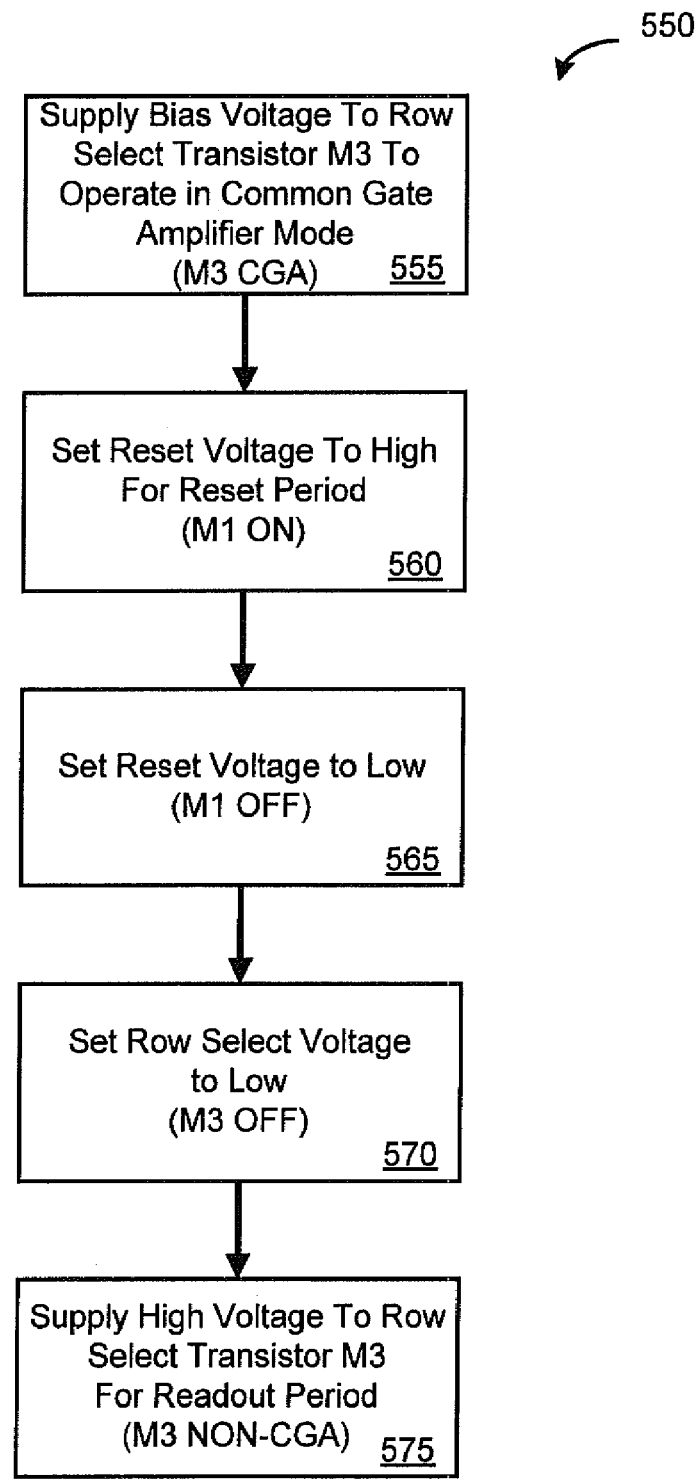
FIG. 16 illustrates one embodiment of a common gate amplifier method for implementing the common gate amplifier mode.

FIG. 16 illustrates one embodiment of a common gate amplifier method 550 for implementing the CG amplifier mode. The CG amplifier method 550 is compatible with the pixel circuit 500 of FIGS. 12-13 and the pixel circuit 525 of FIGS. 14-15. Furthermore, the CG amplifier method 550 may be facilitated by, for example, the processor 92, the sequencer 96, or other components within the image sensor 62.

The illustrated CG amplifier method 550 begins and the row select supply 110 supplies 555 a row select signal RS to the row select transistor 165. This turns on the row select transistor 165. In the depicted embodiment, the row select signal RS is a bias voltage to operate the row select transistor 165 in a CG amplifier mode. In another embodiment, the row select signal RS may be a high voltage to operate the row select transistor 165 in a non-CG amplifier mode. The row select supply 110 may supply the row select signal RS to the row select transistor 165 for the duration of the reset period. The reset supply 105 subsequently supplies 560 a high reset signal RESET to the reset transistor 170. This turns on the reset transistor 170. The reset supply 105 may apply the reset signal RESET to the reset transistor 170 for the duration of the reset period.

The reset period ends when the reset supply 105 sets 565 the reset signal RESET to low. This turns off the reset transistor 170. The row select supply 110 subsequently sets 570 the row select signal RS to low. This turns off the row select transistor 165. After the reset period has ended, and after an integration period, the row select supply 110 may supply a high row select signal RS to the row select transistor 165 to read out the integrated voltage from the floating node 194, for example. When the row select transistor 165 is on due to a high reset signal RS, the pixel circuit 500, for example, operates in a non-CG amplifier mode because the row select transistor 165 is not operating as a CG amplifier. The depicted mode selection method 550 then ends after the reset and readout periods.

Figure 17:
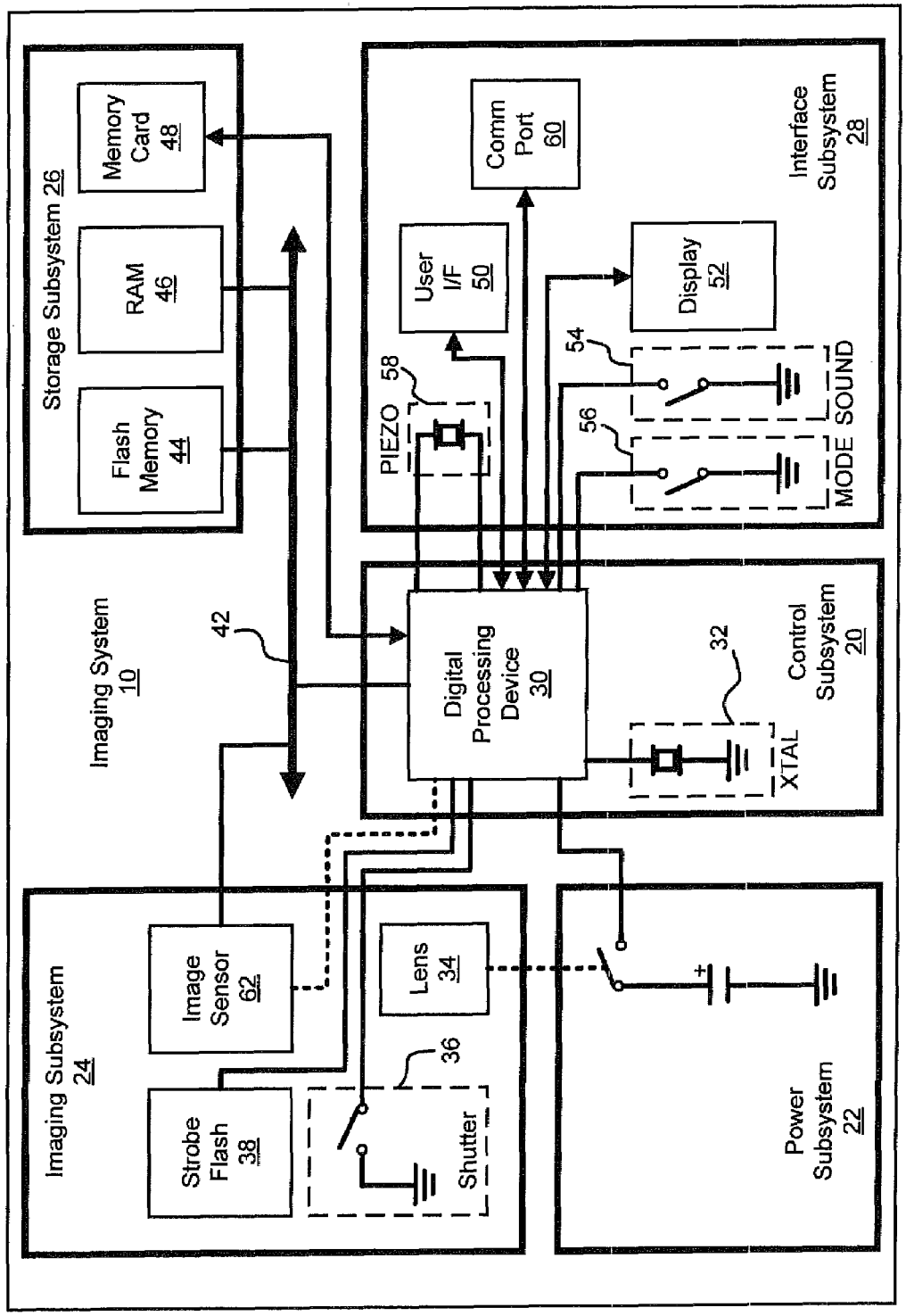
FIG. 17 illustrates one embodiment of an imaging system.

FIG. 17 illustrates one embodiment of an imaging system 10. The imaging system 10 is representative of various imaging systems that may be incorporated in one or more types of imaging devices, including still cameras, video cameras, scanners, automotive cameras, and so forth. For convenience, the imaging system 10 may be referred to as a camera 10, but is nevertheless understood to be representative of other types of imaging systems.

The illustrated imaging system 10 includes a control subsystem 20, a power subsystem 22, an imaging subsystem 24, a storage subsystem 26, and an interface subsystem 28. Although each of these subsystems is described herein with particular detail, other embodiments of the imaging system 10 may include fewer or more subsystems and/or fewer or more component parts of the individual subsystems.

In one embodiment, the control subsystem 20 includes a digital processing device 30. The digital processing device 30 may be may include one or more general-purpose processing devices such as a microprocessor or central processing unit, a controller, or the like. Alternatively, the digital processing device 30 may include one or more special-purpose processing devices such as a digital signal processor (DSP), an application specific integrated circuit (ASIC), a field programmable gate array (FPGA), or the like. Additionally, the digital processing device 30 may include any combination of general-purpose processing device(s) and special-purpose processing device(s). In an alternative embodiment, for example, the digital processing device 30 may be a network processor having multiple processors including a core unit and multiple microengines. In the illustrated embodiment, the digital processing device 30 is an ASIC, but references to the ASIC 30 herein are understood to be representative of the digital processing device 30, generally.

The digital processing device 30 may include a microprocessor, one or more memory devices, control logic, and the like, in order to implement particular operations within imaging system 10. For example, the digital processing device 30 may facilitate taking a digital picture, including acquiring an image via the imaging subsystem 24, digitizing the image, processing the image, displaying the image via the interface subsystem 28, storing the image via the storage subsystem 26, and transferring the image to an external storage device (not shown). Similarly, the digital processing device 30 may implement instructions from a user received via the interface subsystem 28. In one embodiment, the digital processing device 30 also may include an internal read-only memory (ROM) for firmware storage. Furthermore, the digital processing device 30 may facilitate firmware or software updates within the imaging system 10. The control subsystem 20 also may include a quartz crystal 32, oscillator, or other clocking device to supply a clock signal to the digital processing device 30.

In one embodiment, the power subsystem 22 includes a battery circuit to supply electrical power to the digital processing device 30 and other subsystems within the imaging system 10. The power subsystem 22 may include a permanent battery, temporary batteries, a recharging circuit, regulators or other current control circuitry, one or more switches, and so forth. In another embodiment, the power subsystem 22 may include a power adapter to accept alternating current (AC) or direct current (DC) power from an external power supply (not shown). In another embodiment, the power subsystem 22 may be configured to accept power via a universal serial bus (USB) port, or other communication port, whenever the imaging system 10 is plugged into a PC or other computing device.

In one embodiment, the imaging subsystem 24 includes a lens assembly 34 having one or more optical lenses, a shutter 36, a strobe flash 38, and the image sensor 62. The imaging subsystem 24 captures images and converts them into digital form. In one embodiment, the image sensor 62 may be coupled to a bus 42 that is coupled to the digital processing device 30. One example of the image sensor 62 is depicted and described in more detail with reference to FIG. 4.

The lens assembly 34 directs incident light to a pixel array within the image sensor 62. In one example, the lens assembly 34 may include a lens stack integrated with the image sensor 62. In another embodiment, the lens assembly 34 may have other characteristics. The shutter 36 allows the light to be detected by the image sensor 62. The strobe flash 38 provides additional light, in addition to any ambient light, to illuminate a scene approximately during the time the image sensor 62 detects an image. In one example, the strobe flash 38 automatically activates in response to detected low light levels. In other embodiments, lens assemblies, shutters, and flashes that are generally known in the art may be suitable for use with the imaging system 10, although more specialized or custom devices also may be used with the imaging system 10.

In one embodiment, the storage subsystem 26 includes a flash memory device 44, a random access memory (RAM) device 46, and a memory card 48. Although a flash memory 44 is depicted in FIG. 17, other types of memory may be used in conjunction with or in place of the flash memory 44, including read-only memory (ROM), programmable ROM (PROM), erasable PROM (EPROM), and electrically erasable PROM (EEPROM). Alternatively, other types of memory may be used. The flash memory 44 and the RAM 46 may be coupled to the bus 42. The digital processing device 30 may coordinate bus arbitration and the transfer of image data from the imaging subsystem 24 to the storage subsystem 26. The RAM 46 may be nonvolatile and store software or other control instructions that are used by the digital processing device 30 to operate the imaging system 10. For example, the digital processing device 30 may load firmware instructions from an internal ROM into the RAM 46. In one example, the RAM 46 is synchronous RAM (SRAM). In another embodiment, the RAM 46 is synchronous dynamic RAM (SDRAM). Alternatively, the RAM 46 may be another type of volatile or nonvolatile RAM.

The flash memory 44 or the RAM 46 may store images and/or image metadata (e.g., image capture parameters, camera mode settings, electrical power settings, etc.) from the imaging subsystem 24, for example. In one embodiment, the image data is initially stored in the RAM 46 and then transferred to the flash memory 44 for more permanent storage. The digital processing device 30 may initiate a direct memory transfer (DMA) to transfer the image data from the RAM 46 to the flash memory 44. The microprocessor within the digital processing device 30 may include several DMA engines to perform the DMA operations. In certain embodiments, the DMA engines may facilitate the following transfers: imaging subsystem 24 to RAM 46, RAM 46 to flash memory 44, flash memory to RAM 46, RAM 46 to memory card 48, memory card 48 to RAM 46, and so forth. In one embodiment, the flash memory 44 is NAND flash memory ranging in size from 4 to 32 megabytes (MB), although other types and/or sizes of flash memory may be used.

The memory card 48 is a memory card such as a secure digital (SD) memory card, a mini SD card, an ultra-compact (xD) memory card, a multimedia card (MMC), a microdrive, a universal serial bus (USB) flash drive, or another type of removable or non-removable memory media. In one embodiment, the memory card 48 may be permanently coupled to the storage subsystem 26.

In one embodiment, the interface subsystem 28 includes a user interface (I/F) module 50, a display device 52, one or more sound modules 54, one or more mode modules 56, a piezo buzzer module 58 (also known as a piezo resonator), and a communication port 60. The user interface module 50 may include hardware components such as buttons, as well as accompanying software, to allow a user to interface with the imaging system 10. In particular, the user interface module 50 may allow a user to make selections regarding the operation of the imaging system 10, the use of the strobe flash 38 and other capture parameters, the location of stored images on the storage subsystem 26, and so forth. Additionally, the interface subsystem 28 may be partially or wholly configurable by the firmware.

The display device 52 communicates visual images, including digitized images from the imaging subsystem 24, user selection menus, status indicators, and so forth, to the user. In one embodiment, the display device 52 is a liquid crystal display (LCD) such as a thin film transistor (TFT) display. In another embodiment, the display device 52 may employ another technology to generate and present an image to the user. The sound module 54 controls sounds produced by the imaging system 10. The mode module 56 controls the operational mode of the imaging system 10. For example, the imaging system 10 may have various capture modes, including bright, dark, far, near, action, portrait, and so forth. The buzzer module 58, in one embodiment, is a piezo resonator to produce variable pitch tones.

The communication port 60 allows connectivity with another electronic device such as a desktop computer (not shown) or other computing device. In the illustrated embodiment, the communication port 60 is a USB port, but references to the USB port 60 herein are understood to refer to the communication port 60, generally. In one embodiment, the communication port 60 may be used to provide power to recharge a battery in the power subsystem 22, transfer images and image metadata from the storage subsystem 26 (e.g., the flash memory 44 or the memory card 48) to a desktop computer, for example, and communicate firmware upgrades from the desktop, for example, to the digital processing device 30. In one example, the communication port 60 may be a USB 2.0 port.

The electronic components of the imaging system 10 may each reside on a different die substrate and in different chip packages. Alternatively, some or all of the electronic components of the imaging system 10 may reside in a common chip package on separate integrated circuit die substrates or on a common die substrate.

The image sensor 62 discussed herein may be used in various applications. For example, embodiments of the image sensor 62 may be used in a digital camera system for general-purpose photography (e.g., camera phone, still camera, video camera) or special-purpose photography. In other embodiments, the image sensor 62 may be used in other types of applications. For example, embodiments of the image sensor 62 may be used in machine vision, document scanning, microscopy, security, biometry, and other similar applications.

Although the operations of the method(s) herein are shown and described in a particular order, the order of the operations of each method may be altered so that certain operations or performed in an inverse order or so that certain operation may be performed, at least in part, concurrently with other operations. In another embodiment, instructions or sub-operations of distinct operations may be in an intermittent and/or alternating manner.

While some specific embodiments of the invention have been shown the invention is not to be limited to these embodiments. The invention is to be understood as not limited by the specific embodiments described herein, but only by scope of the appended claims.

What is claimed is:

1. A method, comprising:
    applying a reset signal at a reset voltage to a reset transistor within a pixel circuit;
    stepping the reset signal from the reset voltage to a predetermined voltage after a stabilization period of the reset transistor; and
    decreasing the reset signal from the predetermined voltage to a sub-threshold voltage during a bias period of the reset transistor, the sub-threshold voltage being a voltage below a threshold voltage of the reset transistor.

2. The method of claim 1, wherein decreasing the reset signal from the predetermined voltage to a sub-threshold voltage comprises applying a decreasing staircase waveform to the reset transistor.

3. The method of claim 1, wherein decreasing the reset signal from the predetermined voltage to a sub-threshold voltage comprises applying a decreasing ramp waveform to the reset transistor.

4. The method of claim 1, wherein decreasing the reset signal from the predetermined voltage to a sub-threshold voltage comprises applying a decreasing taper waveform to the reset transistor.

5. The method of claim 1, further comprising reducing a reset noise signal within the pixel circuit.

6. The method of claim 1, wherein the pixel circuit operates in a common source amplifier mode.

7. The method of claim 6, wherein a common source amplifier circuit facilitates the common source amplifier mode, the common source amplifier circuit comprising a sense transistor and a current source.

8. The method of claim 7, further comprising lowering a first bandwidth, associated with the reset transistor and a sense capacitor, below a second bandwidth, associated with the common source amplifier circuit.

9. The method of claim 1, further comprising isolating the reset transistor from a sense node by an isolation transistor coupled between the reset transistor and the sense node.

10. The method of claim 1, wherein the predetermined voltage comprises a voltage below a threshold voltage of the reset transistor.

11. An apparatus, comprising:
    a pixel circuit comprising a reset transistor; and
    a reset supply coupled to the reset transistor to apply a reset signal to the reset transistor;
    said reset supply applying a reset voltage, as the reset signal, to said reset transistor;
    said reset supply stepping the reset signal being applied to said reset transistor from the reset voltage to a predetermined voltage after a stabilization period of said reset transistor; and
    said reset supply decreasing the reset signal from the predetermined voltage to a sub-threshold voltage during a bias period of said reset transistor, the sub-threshold voltage being a voltage below a threshold voltage of said reset transistor.

12. The apparatus of claim 11, wherein the decreasing reset signal comprises a decreasing staircase waveform over the bias period.

13. The apparatus of claim 11, wherein the decreasing reset signal comprises a decreasing ramp waveform over the bias period.

14. The apparatus of claim 11, wherein the decreasing reset signal comprises a decreasing taper waveform over the bias period.

15. The apparatus of claim 11, wherein the pixel circuit further comprises:
- a sense transistor having a drain and a gate, the gate coupled to a source of the reset transistor; and
- a current source coupled to the drain of the sense transistor and a drain of the reset transistor, wherein the sense transistor and the current source comprise a common source amplifier circuit configured to operate the pixel circuit in a common source amplifier mode.

16. The apparatus of claim 15, wherein the pixel circuit further comprising a sense capacitor coupled to a photodiode, the gate of the sense transistor, and a source of the reset transistor, wherein the pixel circuit is configured to reduce a reset noise signal within the pixel circuit in response to lowering of a first bandwidth, associated with the reset transistor and the sense capacitor, below a second bandwidth, associated with the common source amplifier circuit.

17. The apparatus of claim 11, further comprising an isolation transistor coupled between the reset transistor and a sense node to isolate the reset transistor from the sense node.

18. The apparatus of claim 11, wherein the predetermined voltage comprises a voltage below a threshold voltage of the reset transistor.

19. An apparatus, comprising:
- means for applying a reset signal at a reset voltage to a reset transistor within a pixel circuit;
- means for stepping the reset signal being applied to the reset transistor from the reset voltage to a predetermined voltage after a stabilization period of the reset transistor; and
- means for decreasing the reset signal from the predetermined voltage to a subthreshold voltage during a bias period of the reset transistor, the sub-threshold voltage being a voltage below a threshold voltage of the reset transistor.

20. The apparatus of claim 19, wherein said means for decreasing the reset signal from the predetermined voltage to a sub-threshold voltage during a bias period of the reset transistor applies a decreasing staircase waveform to the reset transistor over the bias period.

21. The apparatus of claim 19, further comprising means for operating the pixel circuit in a common source amplifier mode.

22. The apparatus of claim 19, further comprising means for reducing a reset noise signal within the pixel circuit.

23. The apparatus of claim 19, wherein the predetermined voltage comprises a voltage below a threshold voltage of the reset transistor.

* * * * *